(12) United States Patent
Choi et al.

(10) Patent No.: US 11,184,302 B2
(45) Date of Patent: Nov. 23, 2021

(54) METHOD FOR TRANSMITTING CONTENT USING MESSAGE APPLICATION AND ELECTRONIC DEVICE SUPPORTING THE SAME

(71) Applicant: Samsung Electronics Co., Ltd., Gyeonggi-do (KR)

(72) Inventors: Kyuok Choi, Gyeonggi-do (KR); Younghak Oh, Gyeonggi-do (KR); Sunyoung Yi, Gyeonggi-do (KR); Bokeun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/734,276

(22) PCT Filed: Jul. 12, 2019

(86) PCT No.: PCT/KR2019/008626
§ 371 (c)(1),
(2) Date: Dec. 2, 2020

(87) PCT Pub. No.: WO2020/013651
PCT Pub. Date: Jan. 16, 2020

(65) Prior Publication Data
US 2021/0168104 A1     Jun. 3, 2021

(30) Foreign Application Priority Data

Jul. 13, 2018    (KR) ........................ 10-2018-0081527

(51) Int. Cl.
    *G06F 15/16*        (2006.01)
    *H04L 12/58*        (2006.01)
    (Continued)

(52) U.S. Cl.
    CPC .......... *H04L 51/063* (2013.01); *H04L 51/043* (2013.01); *H04L 51/10* (2013.01);
    (Continued)

(58) Field of Classification Search
    CPC ........ H04W 4/12; H04L 51/063; H04L 51/04; H04L 51/24; H04L 51/08
    (Continued)

(56) References Cited

U.S. PATENT DOCUMENTS

2005/0054287 A1    3/2005   Kim
2010/0121982 A1    5/2010   Sumiyoshi
(Continued)

FOREIGN PATENT DOCUMENTS

JP          2011-024018 A     2/2011
KR    10-2006-0041557 A     5/2006
(Continued)

*Primary Examiner* — Kaylee J Huang
(74) *Attorney, Agent, or Firm* — Cha & Reiter, LLC

(57) ABSTRACT

Disclosed are an electronic device and a method. The electronic device includes a display, a communication module and a processor. The processor implements the method, including displaying an execution screen of a message application, receiving a first input signal for selecting identification information about content from transmission through the message application to an external device, determining, responsive to the reception of the first input signal, the number of segments into which the content is to be segmented, based on the size of the content and the maximum attachment size of the message application, displaying at least one thumbnail representing the content and at least one indicator including information about the segmentation; receiving a second input signal requesting transmission of the content; and transmitting at least a portion of the segmented content to the external device responsive to receiving the second input signal.

15 Claims, 17 Drawing Sheets

(51) Int. Cl.
*H04M 1/7243* (2021.01)
*H04W 4/12* (2009.01)

(52) U.S. Cl.
CPC .......... *H04L 51/24* (2013.01); *H04M 1/7243* (2021.01); *H04W 4/12* (2013.01)

(58) Field of Classification Search
USPC ........................................ 709/206, 204, 217
See application file for complete search history.

(56) References Cited

U.S. PATENT DOCUMENTS

| | | |
|---|---|---|
| 2010/0235746 A1 | 9/2010 | Anzures |
| 2012/0147954 A1 | 6/2012 | Kasai et al. |
| 2015/0365716 A1* | 12/2015 | Fonseca, Jr. ....... G06K 9/00751 725/41 |
| 2016/0205340 A1* | 7/2016 | Jang ..................... G11B 27/031 348/14.02 |
| 2017/0025151 A1* | 1/2017 | Han ....................... G06F 3/0484 |
| 2017/0055136 A1 | 2/2017 | Lee et al. |
| 2017/0085732 A1 | 3/2017 | Jwa |
| 2017/0134463 A1* | 5/2017 | Kim ........................ H04L 67/02 |
| 2018/0219871 A1* | 8/2018 | Amin .................... H04L 67/327 |
| 2019/0251648 A1* | 8/2019 | Liu .................. H04N 21/23418 |

FOREIGN PATENT DOCUMENTS

| | | |
|---|---|---|
| KR | 10-2012-0064950 A | 6/2012 |
| KR | 10-2015-0095046 A | 8/2015 |
| KR | 10-2015-0116475 A | 10/2015 |
| KR | 10-2017-0023228 A | 3/2017 |
| KR | 10-2017-0035550 A | 3/2017 |
| KR | 10-1774422 B1 | 9/2017 |

\* cited by examiner

METHOD FOR TRANSMITTING CONTENT USING MESSAGE APPLICATION AND ELECTRONIC DEVICE SUPPORTING THE SAME

CROSS-REFERENCE TO RELATED APPLICATION(S)

This application is a National Phase Entry of PCT International Application No. PCT/KR2019/008626, which was filed on Jul. 12, 2019, and claims priority to Korean Patent Application No. 10-2018-0081527, which was filed on Jul. 13, 2018, the content of each of which are incorporated herein by reference.

TECHNICAL FIELD

Various embodiments of the present disclosure relate to an electronic device and a technique for transmitting content of the electronic device.

BACKGROUND ART

Recently, techniques associated with mobile electronic devices have been developed dramatically. In particular, techniques for transmitting and receiving messages using electronic devices have also been developed for communications between humans.

For example, a user of an electronic device may transmit a message to a user of another electronic device by using a message application installed in the electronic device. In this case, the message may be generally a text message, but may also include various contents.

The message including the content may be transmitted to an external device through the message application. More specifically, the user may search for content to be attached in a message application execution screen. When the user selects attachment content to be attached on a content search screen, the selected content may be transmitted together with the text message.

DETAILED DESCRIPTION OF THE INVENTION

Technical Problem

When attachment content is transmitted, together with a text message, to an external device, content needs to be selected based on the size or volume of the attachment content.

For example, when a maximum attachment size allowing attachment as the attachment content is 1 MB, the user may need to select content of 1 MB or less. In this case, the content to be transmitted as the attachment content may be limited.

In another example, the user may segment content into units less than or equal to the maximum attachment size, and the segmented content segments may be transmitted by being attached as attachment content one by one. In this case, when the number of segmented content segments is N, the user may have to undergo a cumbersome process of repeating attachment of the segmented content segments and transmission to an external device N times.

In another example, there may be a scheme in which an electronic device automatically reduces a size of the content to be attached. According to various embodiments of the present disclosure, an electronic device may downsize content such that the size of the content is less than or equal to a maximum attachment size, when determining that the size of the content exceeds the maximum attachment size. In this case, the resolution of the content may be degraded due to downsizing.

Therefore, a need may exist for a scheme to maximize user's convenience while maintaining the resolution of content when the user selects the content exceeding the maximum attachment size as the attachment content.

Technical Solution

A method for transmitting content by an electronic device according to the present disclosure includes displaying an execution screen of a message application, receiving a first input signal for selecting identification information of content to be transmitted to an external device through the message application, determining a segmentation number of the content, based on a size of the content and a maximum attachment size of the message application, in response to reception of the first input signal, displaying at least one thumbnail representing the content and at least one indicator including segmentation information of the content, receiving a second input signal for requesting transmission of the content, and transmitting at least a part of the content that has been segmented to the external device in response to reception of the second input signal.

An electronic device according to the present disclosure includes a display, a communication module communicable with an external device, at least one processor, and at least one memory electrically connected with the display, the communication module, and the at least one processor. The at least one memory stores instructions that, when executed, cause the at least one processor to control the display to display an execution screen of a message application, to determine a segmentation number of content to be transmitted to an external device through the message application, based on a size of the content and a maximum attachment size of the message application, in response to reception of a first input signal for selecting identification information of the content, to control the display to display at least one thumbnail representing the content and at least one indicator including segmentation information of the content, and to control the communication module to transmit at least a part of the content that has been segmented to the external device, in response to reception of a second input signal for requesting transmission of the content.

A computer program product including a computer-readable recording medium according to the present disclosure includes instructions configured to cause a processor to display an execution screen of a message application, to determine a segmentation number of content to be transmitted to an external device through the message application, based on a size of the content and a maximum attachment size of the message application, in response to reception of a first input signal for selecting identification information of the content, to display at least one thumbnail representing the content and at least one indicator including segmentation information of the content, and to transmit at least a part of the content that has been segmented to the external device, in response to reception of a second input signal for requesting transmission of the content.

MODE FOR CARRYING OUT THE INVENTION

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure.

In the present disclosure, content may include an image, a text, video (or a moving image), audio, or a combination thereof.

In the present disclosure, a user input may include an input using a user's finger or an input made through a stylus pen. According to various embodiments of the present disclosure, the user input may include a user gesture. The user gesture may include at least one of a touch gesture, a hold (or long-press) gesture, a drag gesture, a drag and hold gesture, a pinch zoom-in/out gesture, a swipe gesture, a tap gesture, or a double-tap gesture. According to various embodiments of the present disclosure, the user input may include a hovering input in which a user's finger or a stylus pen does not need to directly contact a screen of the electronic device.

In the present disclosure, a message may include a short text message or a multimedia message as communication information between users, transmitted from an external device to another external device. The message may include a rich communication services (RCS)-based message.

The message may include at least one of a text message or attachment content. The attachment content may include at least a part of the foregoing content. The attachment content may be, but not limited to, recognized as being attached to a text message, and may also be transmitted alone without the text message to an external device.

Figure 1:
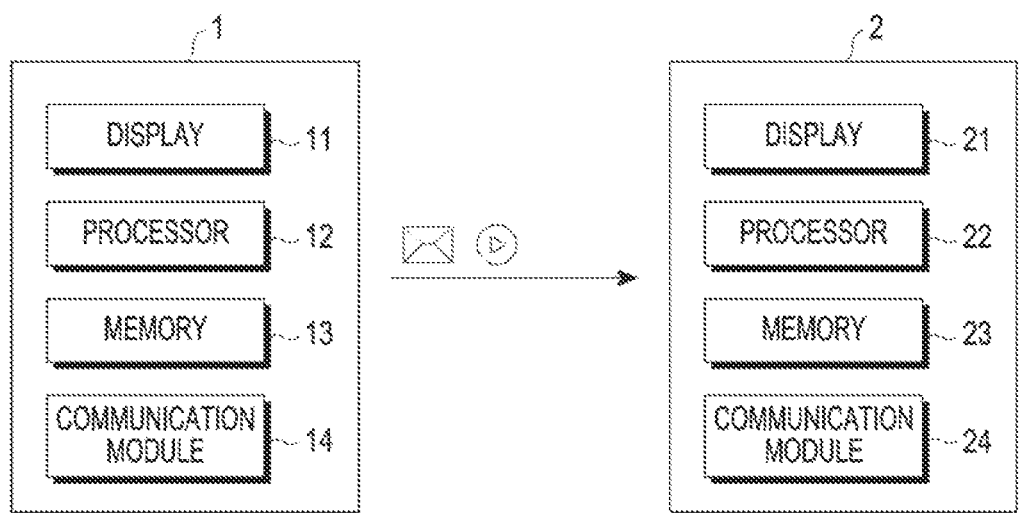
FIG. 1 is a diagram of a system for transmitting content according to various embodiments of the present disclosure.

FIG. 1 is a diagram of a system for transmitting content according to various embodiments of the present disclosure.

The system of FIG. 1 may include a first electronic device 1 which transmits a message and a second electronic device 2 which receives a message. The message may be transmitted through a wireless communication network. Transmission of a message from the first electronic device 1 to the second electronic device 2 may include transmission of the message through a third repeater. The third repeater may include at least one of, for example, a base station, a hub, an access point, a gateway, a switch, a relay server, a repetition server, or a front-end server.

In FIG. 1, the first electronic device 1 may include a display 11, a processor 12, a memory 13, and a communication module 15, and the second electronic device 2 may include a display 21, a processor 22, a memory 23, and a communication module 25. In this case, for convenience of a description, components of the first electronic device 1 and components of the second electronic device 2 will be described together.

First, the displays 11 and 21 may display an execution screen of a message application. The execution screen of the message application may include, for example, a message input screen, a message transmission standby screen, a message edition screen, a message window, etc. The displays 11 and 21 may be coupled to a touch circuit (not shown) so as to operate as a touch screen. The detailed description of the displays 11 and 21 will be provided later with reference to FIGS. 13 and 14, and a repeated description will be avoided. The displays 11 and 21 may correspond to a display device 2060 of FIGS. 13 and 14.

The communication modules 14 and 24 may transmit or receive a message. For example, the communication module 14 of the first electronic device 1 may transmit a message generated by the first electronic device 1 to the second electronic device 2. The communication module 24 of the second electronic device 2 may receive a message from the first electronic device 1. The detailed description of the communication modules 14 and 24 will be provided later with reference to FIG. 13, and a repeated description will be avoided. The communication modules 14 and 24 may correspond to a communication module 2090 of FIG. 13.

The processors 12 and 22 may control at least one component of the electronic devices 1 and 2 by driving a program stored in the memory 13 or control the displays 11 and 21 to display information by processing various data. The detailed description of the processor 12 will be provided later with reference to FIG. 13, and a repeated description will be avoided. The processors 12 and 22 may correspond to a processor 2020 of FIG. 13.

According to various embodiments, the processor 22 of the first electronic device 1 may control the display 11 to display an execution screen of a message application. Upon reception of a first input signal for selecting identification information of content to be transmitted to the second electronic device 2 through the message application from the user, the processor 12 may determine a segmentation number of the content, based on a size or volume of the content and a maximum attachment size of the message application. Alternatively, the processor 12 may control the display 11 to display at least one thumbnail representing the content and at least one indicator including segmentation information of the content. Upon reception of an input signal for requesting transmission of content from a second user, the processor 12 of the first electronic device 1 may control the communication module 14 to transmit at least a part of the segmented content to the second electronic device 2.

The memories 13 and 23 may store various data used by at least one component of the electronic devices 1 and 2, e.g., input data or output data for software, a command, etc. The detailed description of the memory 13 will be provided later with reference to FIG. 13, and a repeated description will be avoided. The memories 13 and 23 may correspond to a memory 2030 of FIG. 13.

According to various embodiments, the memory 13 may store at least one instructions that, when executed, cause the processor 12 to control the display 11 to display an execution screen of a message application, to determine a segmentation number of content to be transmitted to an external device through the message application, based on a size of the content and a maximum attachment size of the message application, upon reception of a first input signal for selecting identification information of the content, to control the display 11 to display at least one thumbnail representing the content and at least one indicator including segmentation information of the content, and to control the communication module 14 to transmit at least a part of the segmented content to the external device, upon reception of a second input signal for requesting transmission of the content.

According to the current embodiment, without a need for the user to separately segment or downsize the content, the electronic device may segment the content and provide segmentation information of the content through the message application. Thus, the number of user manipulation steps for transmitting content exceeding the maximum attachment size is reduced, improving user's convenience and allowing the user to easily recognize a segmentation state of the content.

According to various embodiments, the memory 13 may store at least one instructions configured to cause the processor 12 to control the display 11 to sequentially display a plurality of thumbnails corresponding to the content in the time sequence and to control the communication module 14 to transmit, upon reception of a third input signal for selecting at least one thumbnail from among the plurality of thumbnails from the user, at least a part of the segmented content corresponding to the selected thumbnail to the external device.

According to the current embodiment, the user may selectively transmit at least a part of the content to the outside from among segmented contents depending on user's preference.

According to various embodiments, the memory 13 may store at least one instructions configured to cause the processor 12 to control the display 11 to display a masking user interface (UI) through which at least one of the plurality of thumbnails is selectable in the unit of the maximum attachment size, based on sizes respectively corresponding to the plurality of thumbnails and to control the communication module 14 to transmit, in response to reception of a third input signal for selecting at least one thumbnail from among the plurality of thumbnails by using the masking UI, at least a part of the segmented content corresponding to the selected thumbnail to the external device.

According to the current embodiment, the user may easily confirm content to be segmented through a thumbnail. In addition, the user may easily select desired content to be transmitted in the unit of a maximum attachment size by referring to the thumbnail.

According to various embodiments, the memory 13 may store at least one instructions configured to cause the processor 12 to control the display 11 to sequentially display as many thumbnails as the segmentation number in a vertical direction or in a horizontal direction in the time sequence.

According to the current embodiment, the user may easily recognize which content is segmented and transmitted, and may identify an overview of the content through the thumbnail displayed in the time sequence.

According to various embodiments, the segmentation information may include at least one of whether the content is segmented, the segmentation number of the content, or a segmentation size of the content.

According to various embodiments, the at least one indicator may also include at least one graphics segmenting a thumbnail representing the content or at least one graphics connecting a plurality of thumbnails representing the content, may include graphics for distinguishing a plurality of thumbnails representing the content from one another, or may include graphics indicating stacking of a plurality of thumbnails. Thus, the user may apparently recognize that thumbnails are to be segmented and transmitted.

According to various embodiments, the at least one indicator may be displayed semi-transparently or opaquely to overlap with at least one thumbnail or may be displayed semi-transparently or opaquely around at least one thumbnail.

According to various embodiments, the memory 13 may store at least one instructions configured to cause the processor 12 to control the display 11 to display a UI for confirming segmented transmission of the content from the user when the size of the content exceeds the maximum attachment size.

According to the current embodiment, the user previously determines whether to perform segmented transmission of the content, such that the user's intention not to perform segmented transmission of the content may be reflected in advance.

According to various embodiments, when the segmentation number of the content is N, the number of at least one indicator may be (N−1).

Figure 2:
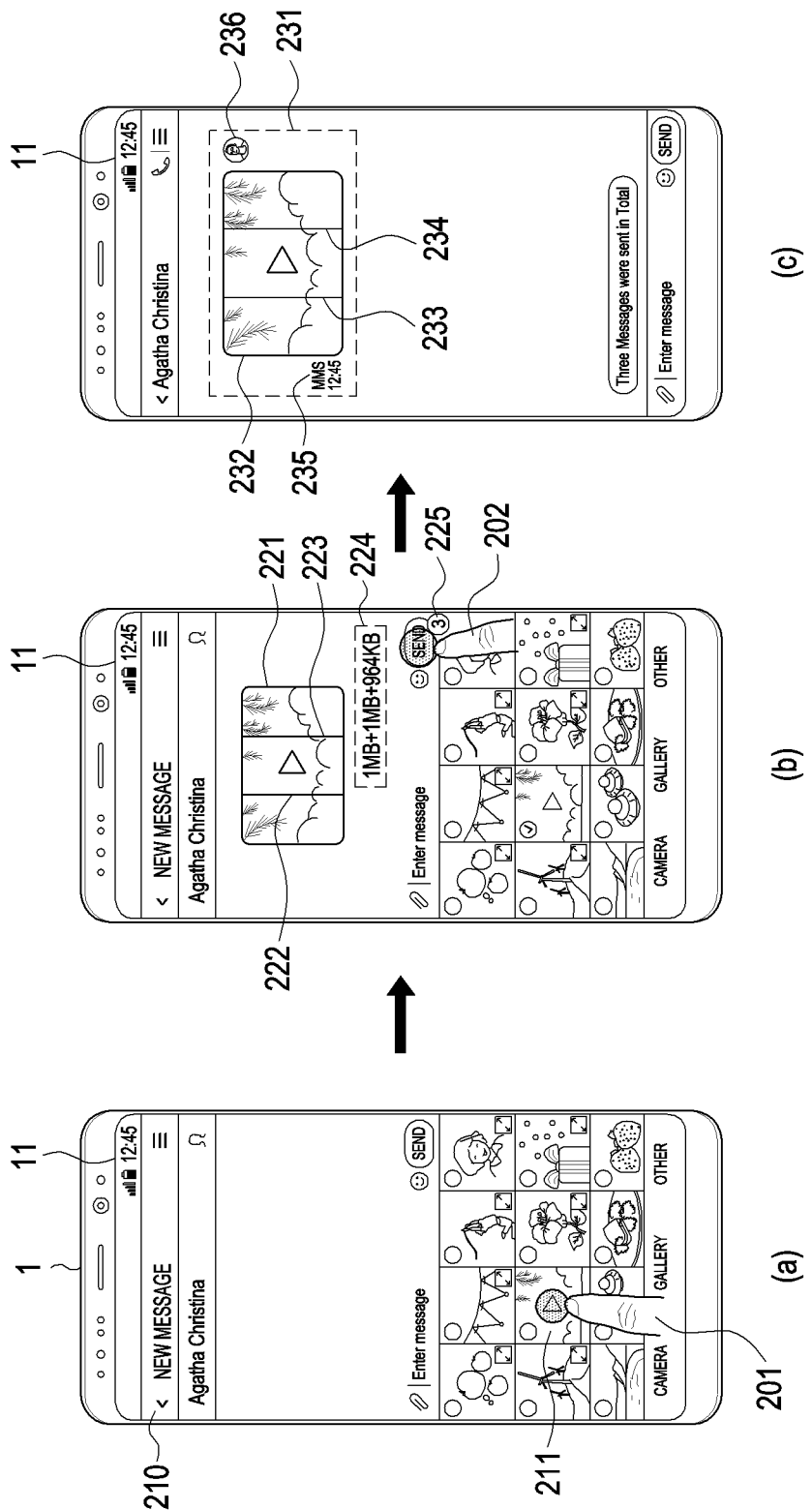
FIG. 2 illustrates a circumstance in which an electronic device according to various embodiments of the present disclosure displays a message.

FIG. 2 illustrates a circumstance in which the electronic device 1 according to various embodiments of the present disclosure displays a message.

In (a) of FIG. 2, the processor 12 of the electronic device 1 may control the display 11 to display an execution screen of a message application. An execution screen 210 of the message application may be a screen on which a user may select attachment content (or an attachment file, attachment data) to be transmitted to a third party. In (a) of FIG. 2, the user may enter a user input 201 for selecting identification information (e.g., a thumbnail of content) 211 of content to be transmitted as attachment content to an external device of the third party. Upon reception of an input signal from a user, the processor 12 may determine a segmentation number of the content for segmented transmission of the content, based on the size of the selected content and the maximum attachment size of the message application. For example, the maximum attachment size of the message application may be a transmission allowable size of the attachment content which may be transmitted by the message application at a time. The maximum allowable size may be, for example, about 1 megabyte (MB), without being limited thereto.

Next, as shown in (b) of FIG. 2, the processor 12 of the electronic device 1 may control the display 11 to display at least one thumbnail 221 representing the content and at least one indicators 222, 223, 224, and 225 including segmentation information of the content on the message transmission standby screen. The segmentation information may include at least one of, for example, whether the content is segmented, a segmentation number of the content, or a segmentation size of the content. In this case, when the segmentation number of the content is N, the number of at least one indicator may be (N−1). For example, assuming that the size of the content exceeds a double of the maximum attachment size, the segmentation number of the content may be 3 and the number of corresponding indicators may be 2. In (b) of FIG. 2, two indicators 222 and 223 may indicate segmentation of the content and the segmentation number of the content. That is, the two indicators 222 and 223 may indicate that the content is segmented into three segments. The indicators 222 and 223 may have the shape of a bar that segments a thumbnail 221, and may be displayed transparently or opaquely to overlap the thumbnail 221.

When an indicator is displayed to overlap a thumbnail, it may mean that they are displayed overlappingly to the user, and it may not be restrictively interpreted as image processing performed by the processor 12 through rendering to overlap the indicator onto the thumbnail. In (b) of FIG. 2, an indicator 224 may indicate a segmentation size of the content. For example, the indicator 224 may indicate that the content is segmented into segments of three sizes of 1 MB, 1 MB, and 964 bytes. An indicator 225 may indicate the segmentation number of the content.

In (b) of FIG. 2, the user may enter a user input 202 for requesting transmission of the selected content.

Upon reception of an input signal from the user, as shown in (c) of FIG. 2, the processor 12 may control the display 11 to display transmission information 231 corresponding to transmission of the content on the message window. In this case, the transmission information 231 may include at least one thumbnail 232 representing the content, at least one indicators 233 and 234 including segmentation information of the content, a transmission time 235 of the content, or a sender 236 of the content.

Figure 3A:
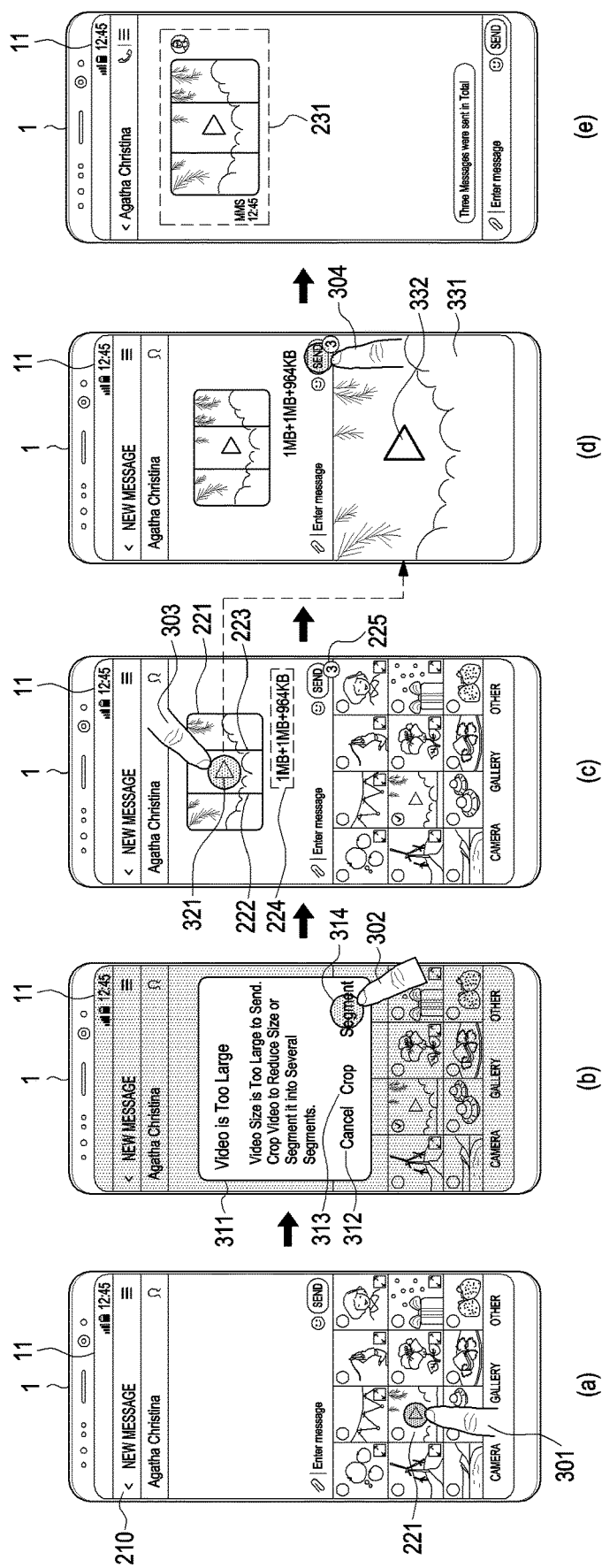
FIGS. 3A, 3B, 4A, 4B, 5A, and 5B illustrate in detail a circumstance in which electronic devices according to various embodiments of the present disclosure transmit and receive messages.
Figure 3B:
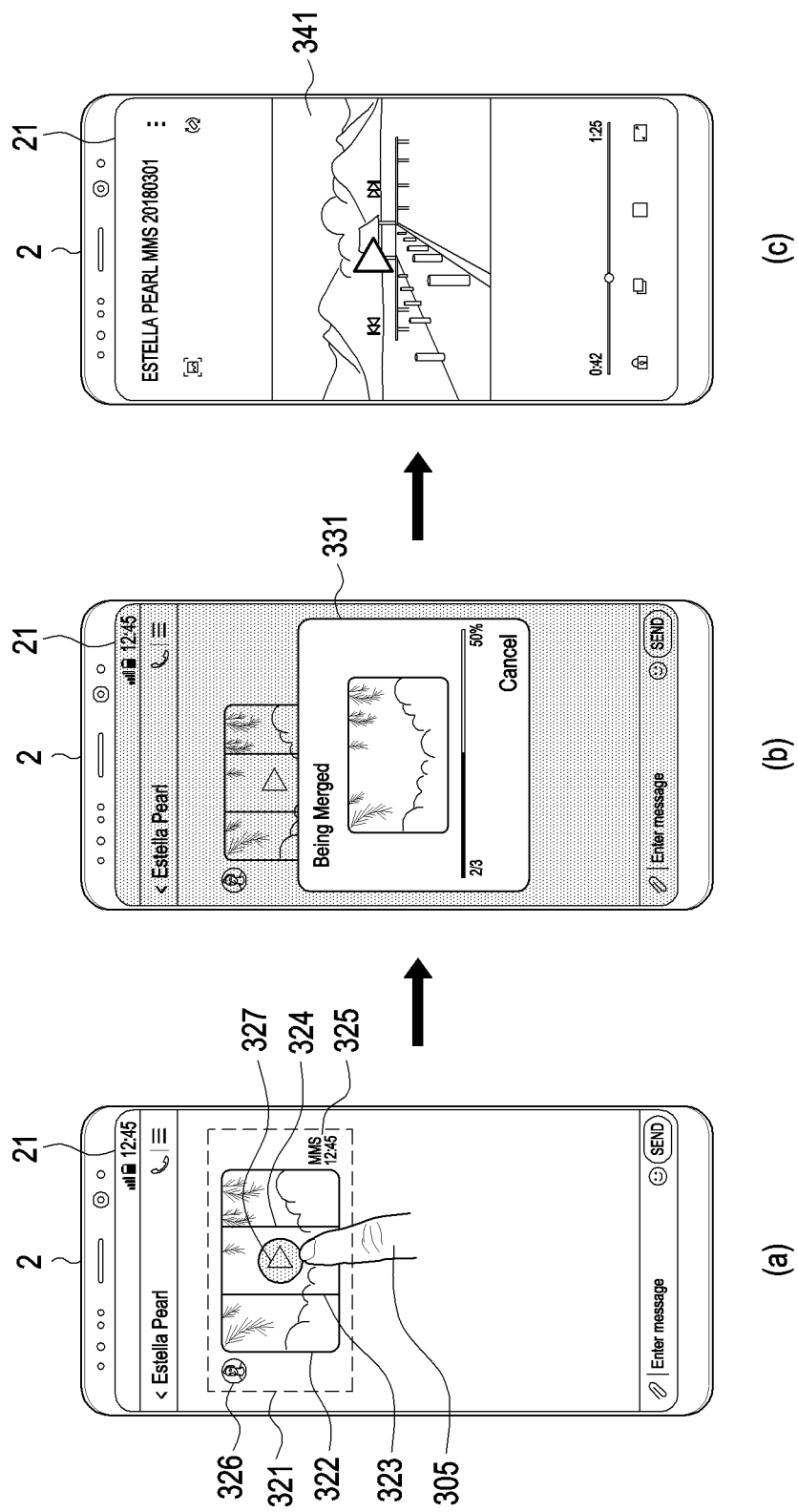

FIGS. 3A and 3B illustrate in detail a circumstance in which electronic devices 1 and 2 according to various embodiments of the present disclosure transmit and receive messages.

In FIG. 3A, when the first electronic device 1 segments and transmits content by using a message application, the second electronic device 2 may receive and play the segmented content in FIG. 3B.

An execution screen of the message application in (a) of FIG. 3A may correspond to a screen of the message application in (a) of FIG. 2, and thus will not be described repeatedly. In (a) of FIG. 3A, when a user input 301 for selecting the identification information 211 of the content is entered, the processor 12 of the electronic device 1 may determine whether the size of the selected content exceeds the maximum attachment size of the message application. When the size of the content exceeds the maximum attachment size, the processor 12 may control the display 11 to display a user interface (UI) 311 for confirming segmented transmission of the content from the user, as shown in (b) of FIG. 3A. The UI 311 may include, for example, a popup window, a floating icon, a bubble icon, a new screen, etc. The UI 311 may include a button 312 for canceling segmented transmission, a crop button 313 for cropping the content within the maximum attachment size, and a segment button 314 for segmenting and transmitting the content. In (b) of FIG. 3A, the user may enter a user input 302 for selecting the segment button 314 to segment and transmit the content.

Upon reception of the user input 302, as shown in (c) of FIG. 3A, the processor 12 may control the display 11 to display the message transmission standby screen. The message transmission standby screen in (c) of FIG. 3A may correspond to the message transmission standby screen in (b) of FIG. 2, and thus will not be described repeatedly. In (c) of FIG. 3A, the user may enter a user input 303 for selecting the thumbnail 221 (or a play icon 321 included in the thumbnail 221) to confirm content to be transmitted.

Upon reception of an input signal from the user, the processor 12 may control the display 11 to display currently played content, or to display an icon 332 for controlling playback of the content overlappingly on another thumbnail 331 representing the content as shown in (d) of FIG. 3A. Upon reception of the input signal for selecting the icon 332 from the user, the processor 12 may control the display 11 to display the currently played content. The processor 12 may display the currently played content on a region of the screen. The region may include, but not limited to, a virtual keyboard display region, a soft input panel (SIP) region, etc.

In (d) of FIG. 3A, the user may enter a user input 304 for requesting transmission of the selected content.

Upon reception of an input signal from the user, as shown in (e) of FIG. 3A, the processor 12 may control the display 11 to display a message window including the transmission information 231. The message window of (e) of FIG. 3A may correspond to the message window of (c) of FIG. 2, and thus will not be described repeatedly.

Based on the input signal of the user, the processor 12 may control the communication module 14 to transmit the segmented content to the external device. For example, the processor 12 may control the communication module 14 to transmit previously segmented content to the external device sequentially or in parallel. In another example, the processor 12 may crop a part of the content and sequentially transmit the same to the external device.

In FIG. 3B, the external device (e.g., the second electronic device 2 of FIG. 1) may receive the segmented content through the communication module 24. For example, the electronic device 2 may sequentially receive the segmented content or simultaneously receive the segmented content through multiple channels.

Upon reception of at least a part of the segmented content, as shown in (a) of FIG. 3B, the processor 22 of the electronic device 2 may control the display 21 to display reception information 321 corresponding to reception of the content on the message window. In this case, the reception information 321 may include at least one thumbnail 322 representing the received content, at least one indicators 233 and 234 including segmentation information of the received content, a reception time 325 of the content, or an sender 326 of the content. In this case, the reception time 325 of the content may indicate a time at which the segmented content is entirely received, a time at which initial content of the segmented content is received, or a time at which the content is transmitted from the electronic device 1.

According to various embodiments, the electronic device 2 may receive the thumbnail 322 representing the content before receiving the segmented content through the communication module 24. Upon reception of the thumbnail 322 representing the content, as shown in (a) of FIG. 3B, the processor 22 may control the display 21 to previously display the received thumbnail 322 on a message window.

In (a) of FIG. 3B, the user of the electronic device 2 may enter a user input 305 for selecting the thumbnail 322 (or a play icon 327 included in the thumbnail 322) representing the content to play the received content.

Upon reception of the input signal from the user, as shown in (b) of FIG. 3B, the processor 22 of the electronic device 2 may perform an operation of merging segmented contents. During merging of the segmented contents, the processor 22 may control the display 21 to display a UI 331 indicating on-going execution of the merging on a screen.

When the segmented contents are entirely merged, as shown in (c) of FIG. 3B, the processor 22 of the electronic device 2 may control the display 21 to display currently played or to-be-played content 341. In this case, the processor 22 may execute a media application and play the content 341 through the media application.

According to various embodiments, without a separate input from the user, upon entire merging of the segmented contents, the content 341 in (c) of FIG. 3B may be displayed automatically.

According to various embodiments, the processor 22 of the electronic device 2 may previously merge the segmented contents before displaying the reception information 321 on the message window. In this case, upon entry of the user input 304 for selecting the thumbnail 322 in (a) of FIG. 3B, the processor 22 may skip a process in (b) of FIG. 3B and control the display 21 to display the currently played content 341 as shown in (c) of FIG. 3B.

According to various embodiments, when the electronic device 2 previously receives the thumbnail 322 representing the content, the processor 22 may control the display 21 to display the received thumbnail 322 on the message window as shown in (a) of FIG. 3B. In this case, upon entry of a user input 305 for selecting the thumbnail 322, the processor 22 may receive the segmented contents corresponding to the thumbnail 322 and control the display 21 to merge the segmented contents and display the merged content. Alternatively, as the processor 22 receives the segmented contents corresponding to the thumbnail 322, the processor 22 may control the display 21 to play the received contents in real time.

Figure 4A:
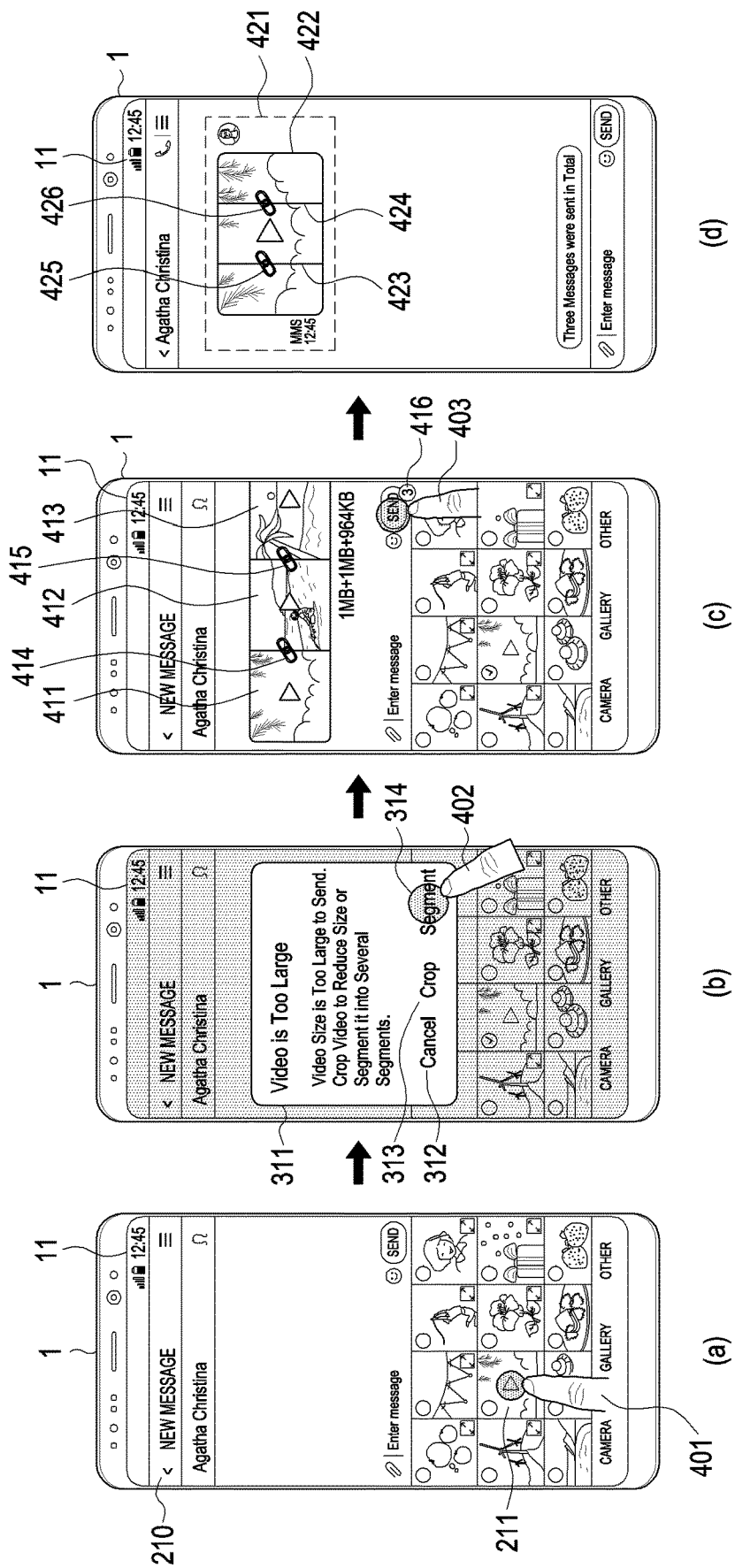
Figure 4B:
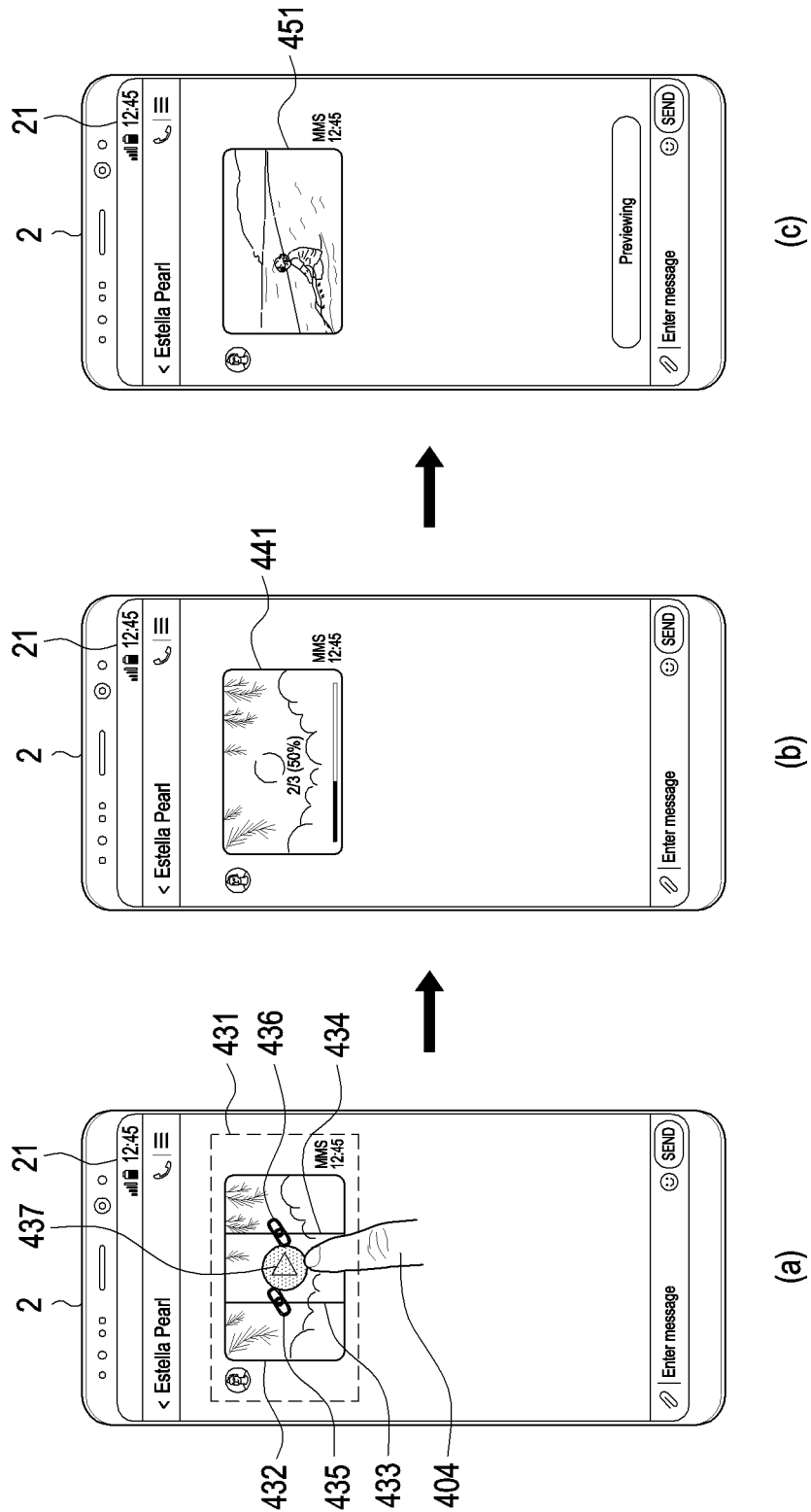

FIGS. 4A and 4B illustrate a circumstance in which electronic devices 1 and 2 according to various embodiments of the present disclosure transmit and receive messages.

When the first electronic device 1 segments and transmits content by using the message application in FIG. 4A, the second electronic device 2 may receive and play the segmented content in FIG. 4B.

(a) and (b) of FIG. 4A correspond to the above-described screens of (a) and (b) of FIG. 3A and thus a repeated description will be avoided. In (b) of FIG. 4A, upon entry of a user input 402 for selecting the segment button 314, the processor 12 may control the display 11 to display a plurality of thumbnails 411, 412, and 413 representing the content and a plurality of indicators 414, 415, and 416 including the segmentation information of the content. The plurality of indicators 414 and 415 may have the shape of a chain to indicate connection of the plurality of thumbnails 411, 412, and 413. The indicator 416 may indicate the segmentation number of the content.

In (c) of FIG. 4A, the user may enter a user input 403 for requesting transmission of the content.

Upon reception of an input signal from the user, as shown in (d) of FIG. 4A, the processor 12 may control the display 11 to display transmission information 421 corresponding to transmission of the content on the message window. In this case, the transmission information 421 may include at least one thumbnail 422 representing the content, indicators 423 and 424 in the shape of a bar indicating that the content is segmented, and indicators 425 and 426 in the shape of a chain indicating that segmented contents are associated with one another.

Upon reception of an input signal corresponding to the user input 403 from the user, the processor 12 may control the communication module 14 to transmit the segmented content to the external device.

In FIG. 4B, the external device (e.g., the second electronic device 2 of FIG. 1) may receive the segmented content through the communication module 24.

Upon reception of at least a part of the segmented content or a thumbnail of the content, as shown in (a) of FIG. 4B, the processor 22 of the electronic device 2 may control the display 21 to display reception information 431 corresponding to reception of the content on the message window. In this case, the reception information 431 may include at least one thumbnail 432 representing the received content, indicators 423 and 434 in the shape of a bar including segmentation information of the received content, and indicators 435 and 436 in the shape of a chain.

In (a) of FIG. 4B, the user may enter a user input 304 for selecting the thumbnail 432 (or a play icon 437 included in the thumbnail 432).

Upon reception of the input signal from the user, as shown in (b) of FIG. 4B, the processor 22 of the electronic device 2 may perform an operation of merging the segmented content. In this case, the processor 22 may display a UI 441 indicating that the segmented content is being merged in a region where at least a part of the reception information 431 is displayed. For example, the processor 22 may display the UI 441 on the region where the thumbnail 432 of the content is displayed.

When the segmented content is entirely merged, as shown in (c) of FIG. 4B, the processor 22 of the electronic device 2 may control the display 21 to display preview content 451. In this case, the preview content 451 may be displayed, for example, on the region where the thumbnail 432 of the content is displayed.

According to various embodiments, the preview content 451 may be played in real time during merging of the segmented content.

According to various embodiments, the electronic device 2 may merely receive the preview content 451 of a small size representing the content. In this case, the electronic device 2 may receive the segmented content through the communication module 24 during playback of the preview content 451.

Figure 5A:
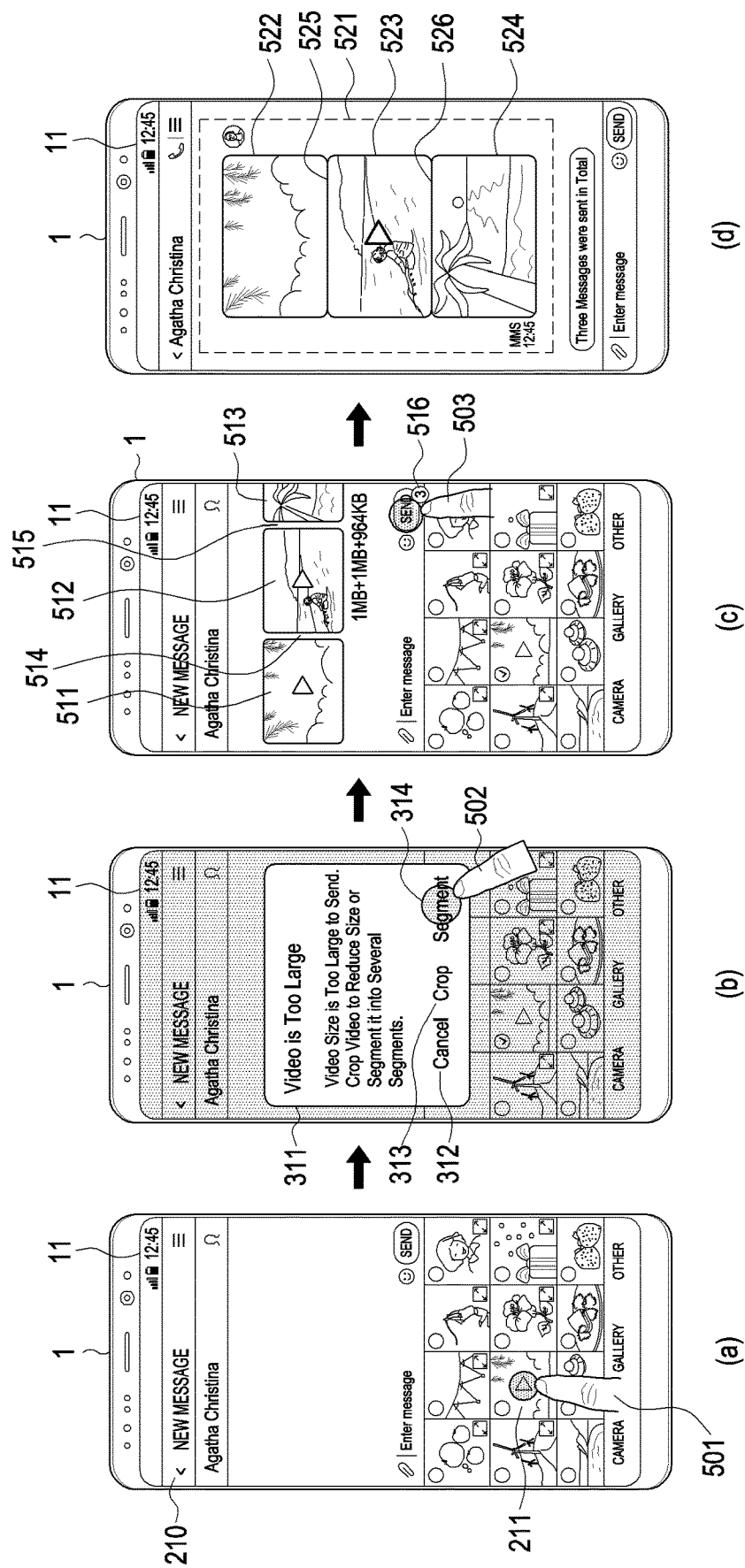
Figure 5B:
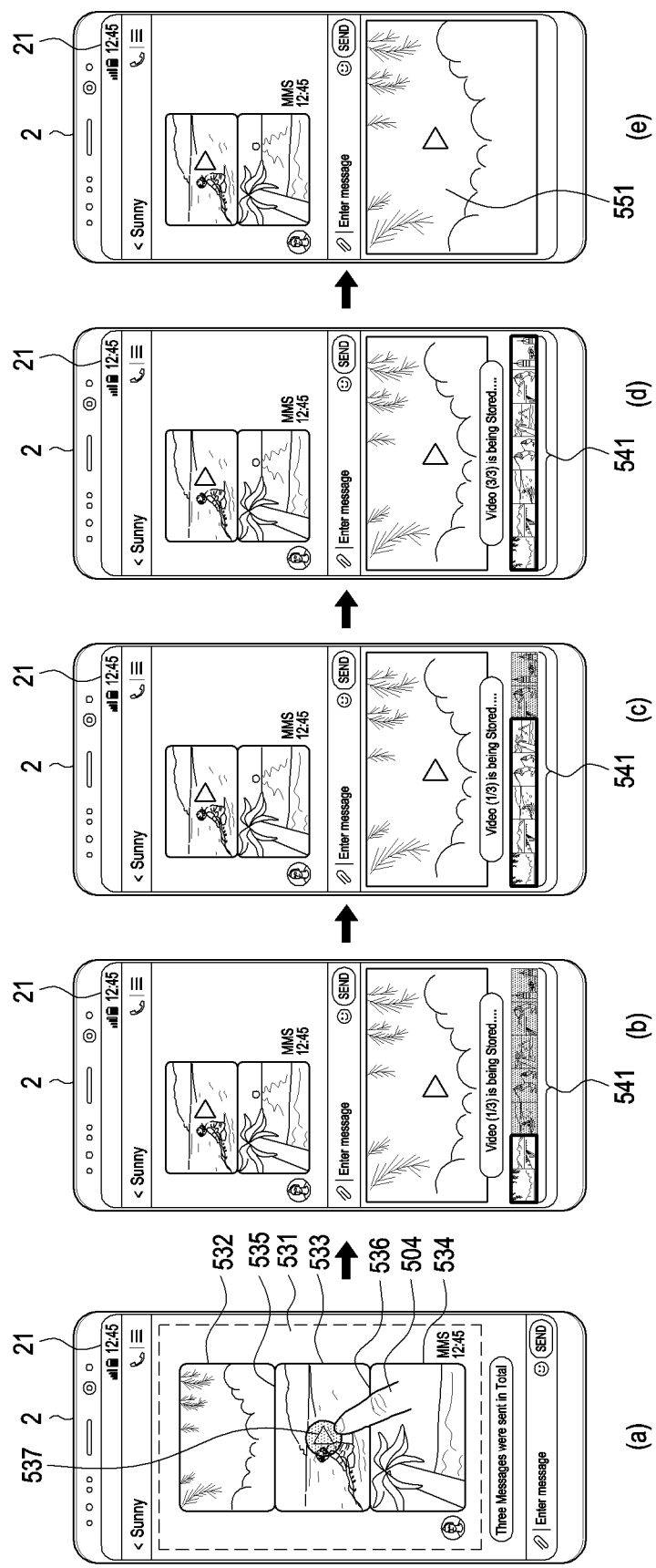

FIGS. 5A and 5B illustrate a circumstance in which the electronic devices 1 and 2 according to various embodiments of the present disclosure transmit and receive messages.

In FIG. 5A, when the first electronic device 1 segments and transmits content by using a message application, the second electronic device 2 may receive and reproduce the segmented content in FIG. 5B.

(a) and (b) of FIG. 5A correspond to the above-described screens of (a) and (b) of FIG. 3A and thus a repeated description will be avoided. In (b) of FIG. 5A, upon entry of a user input 502 for selecting the segment button 314, the processor 12 may control the display 11 to display a plurality of thumbnails 511, 512, and 513 representing the content and a plurality of indicators 514, 515, and 516 including the segmentation information of the content. The plurality of indicators 514 and 515 may be gaps separating the plurality of thumbnails 511, 512, and 513 from one another. The indicator 516 may indicate the segmentation number of the content.

Next, in (c) of FIG. 5A, the user may enter a user input 503 for requesting transmission of the content. Upon reception of an input signal from the user, as shown in (d) of FIG. 5A, the processor 12 may control the display 11 to display transmission information 521 corresponding to transmission of the content on the message window. In this case, the transmission information 521 may include a plurality of thumbnails 522, 523, and 524 representing the content and indicators 525 and 526 including segmentation information of the content. The indicators 525 and 526 may be boundaries for distinguishing the plurality of thumbnails 522, 523, and 524 from one another.

Upon reception of an input signal corresponding to the user input 503 from the user, the processor 12 may control the communication module 14 to transmit the segmented content to the external device.

In FIG. 5B, an external device (e.g., the second electronic device 2 of FIG. 1) may receive the segmented content through the communication module 24.

Upon reception of at least a part of the segmented content or a thumbnail of the content, as shown in (a) of FIG. 5B, the processor 22 of the electronic device 2 may control the display 21 to display reception information 531 corresponding to reception of the content on the message window. In this case, the reception information 531 may include a plurality of thumbnails 532, 533, and 534 representing the received content and indicators 535 and 536 that are boundaries for distinguishing the plurality of thumbnails 532, 533, and 534 from one another.

In (a) of FIG. 5B, the user may enter a user input 504 for selecting a thumbnail 533 (or a play icon 537 included in the thumbnail 533) from among the plurality of thumbnails 532, 533, and 534.

Upon reception of the input signal from the user, the processor 22 of the electronic device 2 may perform an operation of merging the segmented content. That is, the processor 22 may perform an operation of merging segmented contents, respectively corresponding to the plurality of thumbnails 532, 533, and 534. In this case, as shown in (b) through (d) of FIG. 5B, the processor 22 may control the display 21 to display a UI indicating a progress of merging of the segmented content while changing a shadow or a brightness of thumbnails 541 of the content over time. The thumbnails 541 of the content included in the UI may be thumbnails respectively corresponding to the plurality of thumbnails 532, 533, and 534. Alternatively, a plurality of corresponding thumbnails may be generated for each segmented content, such that the thumbnails 541 of the content included in the UI may be a plurality of thumbnails exceeding the number of segmented contents.

When the segmented contents are entirely merged, as shown in (e) of FIG. 5B, the processor 12 may control the display 21 to display currently played or to-be-played content 551. In this case, the content 551 may be displayed in a full screen state on an SIP region. Alternatively, the content 551 may be displayed in a full screen state on the entire screen region. Alternatively, the content 551 may be executed through a media application.

Figure 6:
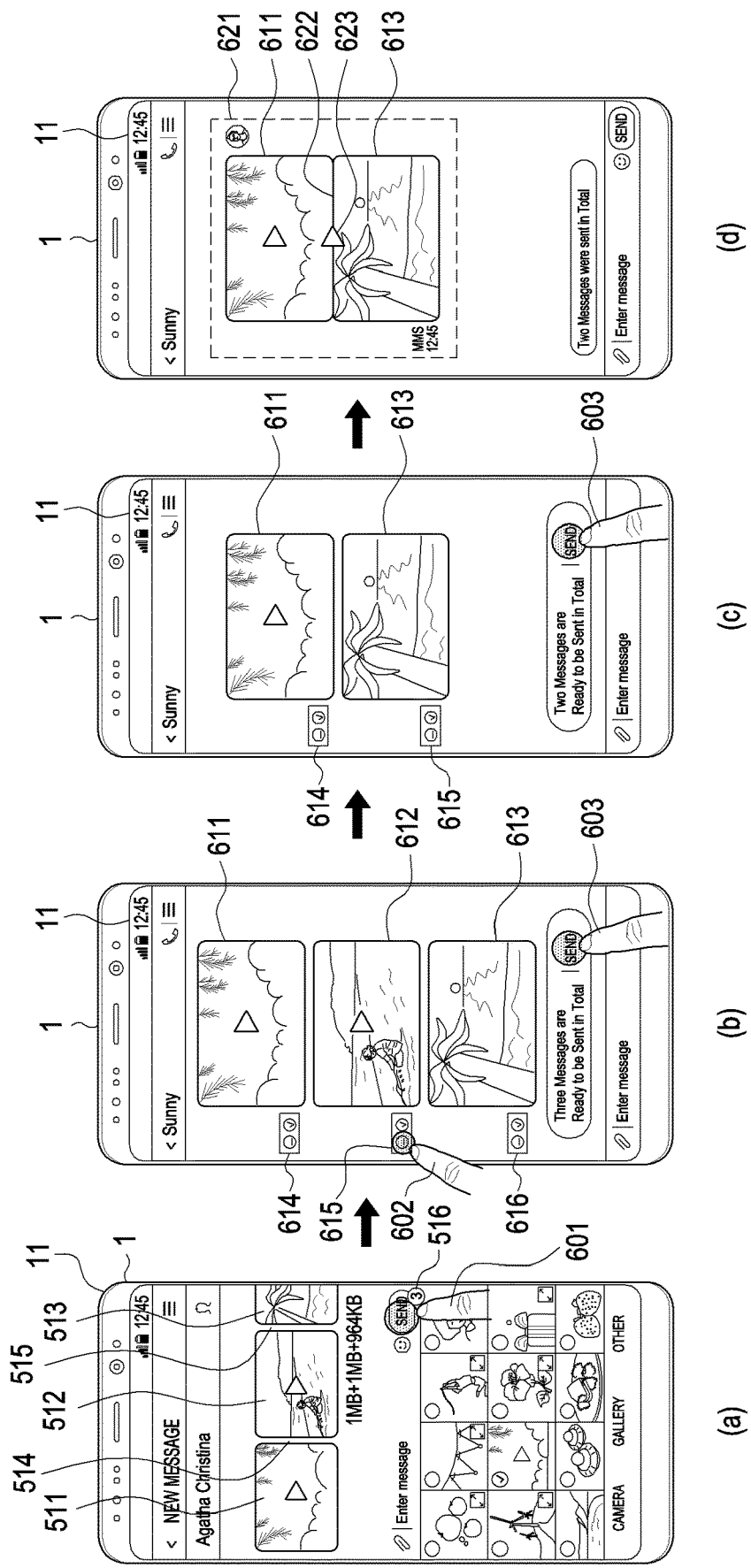
FIGS. 6, 7, 8, 9, and 10 illustrate a circumstance in which a message to be transmitted is edited according to various embodiments of the present disclosure.

FIG. 6 illustrates a circumstance in which a message to be transmitted is edited according to various embodiments of the present disclosure.

Referring to (a) of FIG. 6, the electronic device 1 may display a message transmission standby screen. The message transmission standby screen in (a) of FIG. 6 may correspond to the message transmission standby screen in (c) of FIG. 5A, and thus will not be described repeatedly. In (a) of FIG. 6, the user may enter a user input 601 for requesting transmission of content.

Upon reception of an input signal from the user, as shown in (b) of FIG. 6, the processor 12 may display a message edition screen through which a message to be transmitted is editable. In (b) of FIG. 6, the processor 12 may control the display 11 to sequentially display a plurality of thumbnails 611, 612, and 613 representing the content in a vertical direction on the message window over time. At this time, the number of thumbnails 611, 612, and 613 may be equal to the segmentation number of the content. That is, each of the plurality of thumbnails 611, 612, and 613 may represent each of segmentation contents. Herein, the segmentation content may include not only currently segmented content, but also to-be-segmented content. That is, the segmentation content may mean a segment of content that has been segmented or is to be segmented based on the maximum attachment size.

The processor 12 may control the display 11 to display icons 614, 615, and 616 for selecting or deleting the plurality of thumbnails 611, 612, and 613 around or in the plurality of thumbnails 611, 612, and 613. In (b) of FIG. 6, the user may enter a user input 602 for selecting an icon for deleting the thumbnail 612.

Upon reception of an input signal from the user, as shown in (c) of FIG. 6, the processor 12 may control the display 11 to display the other thumbnails 611 and 613 representing the segmented content on the message window. The user may enter a user input 603 for selecting the displayed other thumbnails 611 and 613 as thumbnails of content to be transmitted.

Upon reception of an input signal from the user, as shown in (d) of FIG. 6, the processor 12 may control the display 11 to display a message window including transmission information 621 corresponding to transmission of selected segmentation contents. The transmission information 621 may include thumbnails 611 and 613 respectively representing segmentation contents, an indicator (e.g., a boundary) 622 including segmentation information of content, a play icon 623 for playing the segmentation contents.

Figure 7:
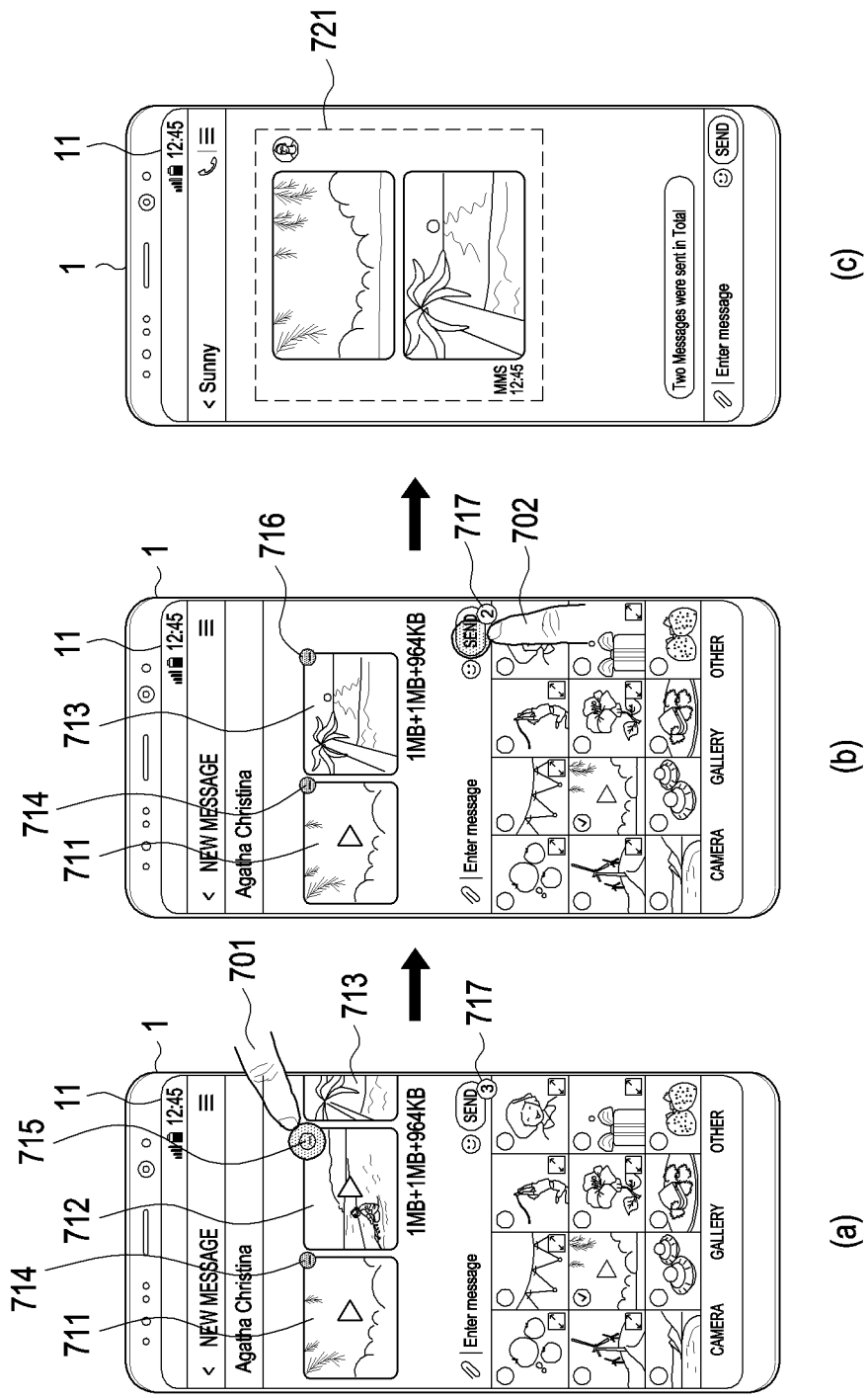

FIG. 7 illustrates a circumstance in which content to be transmitted is edited according to various embodiments of the present disclosure.

Referring to (a) of FIG. 7, the electronic device 1 may display a message transmission standby screen. In this case, the message transmission standby screen may also act as a message edition screen for editing content to be transmitted as attachment content. For example, the processor 12 may control the display 11 to sequentially display a plurality of thumbnails 711, 712, and 713 representing the content in a horizontal direction on a message window over time. Each of the plurality of thumbnails 711, 712, and 713 may represent each of segmentation contents. In this case, the processor 12 may control the display 11 to display icons 714, 715, and 716 for selecting or deleting the plurality of thumbnails 711, 712, and 713 around or in the plurality of thumbnails 711, 712, and 713. In addition, the processor 12 may control the display 11 to display an indicator 717 indicating the segmentation number of the content.

In (a) of FIG. 7, the user may enter a user input 701 for selecting an icon 715 for deleting the thumbnail 712.

Upon reception of an input signal from the user, as shown in (b) of FIG. 7, the processor 12 may control the display 11 to display the other thumbnails 711 and 713 representing the segmented content on the message window. In this case, a number of the indicator 717 indicating the segmentation number of the content may also be changed to correspond to the number of other thumbnails 711 and 713.

The user may enter a user input 702 for selecting the displayed other thumbnails 711 and 713 as thumbnails of content to be transmitted.

Upon reception of an input signal from the user, as shown in (c) of FIG. 7, the processor 12 may control the display 11 to display a message window including transmission information 721 corresponding to transmission of selected segmentation contents.

Figure 8:
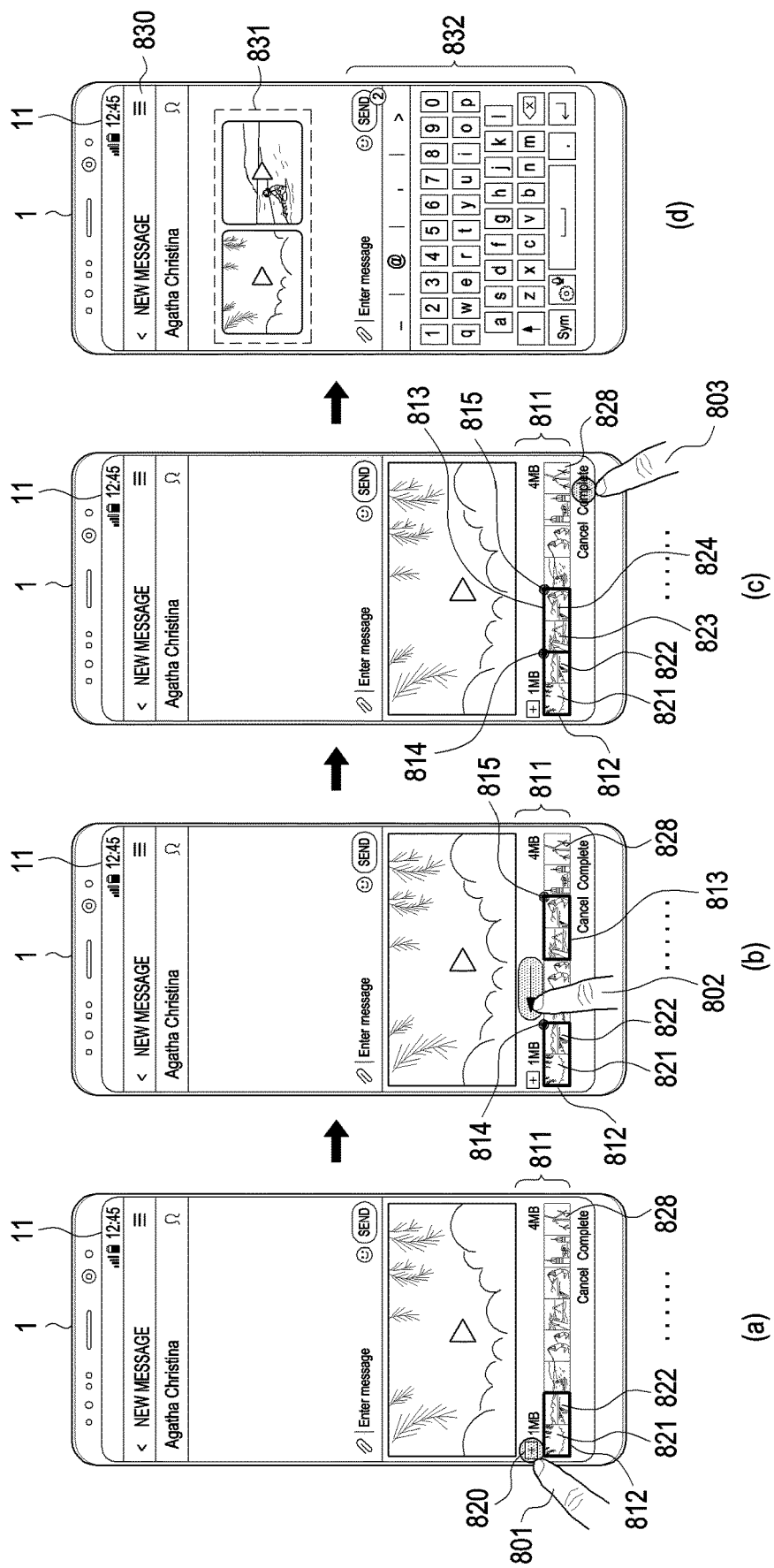

FIG. 8 illustrates a circumstance in which content to be transmitted is edited according to various embodiments of the present disclosure.

In (a) of FIG. 8, the processor 12 may control the display 11 to display an edition UI 811 for editing a message to be transmitted on an SIP region. For example, upon entry of one of the user inputs 302, 303, and 304 of FIG. 3A, the user inputs 402 and 403 of FIG. 4A, or the user inputs 502 and 503 of FIG. 5A from the user, the processor 12 may control the display 11 to display the edition UI 811 for editing a message on the SIP region.

In (a) of FIG. 8, through the edition UI 811, the user may select at least one of a plurality of thumbnails in the unit of a maximum attachment size, based on sizes respectively corresponding to the plurality of thumbnails representing the content. The plurality of thumbnails may be arranged in the form of a stream in a time sequence, and the plurality of thumbnails may correspond to a segmentation content that is a segment of the content. The sizes of the plurality of thumbnails may be the sizes of segmentation contents respectively corresponding to the plurality of thumbnails. For example, assuming that a total size of content is 4 MB and 8 thumbnails are generated, the size of each of the plurality of thumbnails may be 500K.

In this case, there may be a UI for selecting at least one segmentation content to be transmitted to an external device among segmentation contents respectively corresponding to the plurality of thumbnails. For example, there may be a masking UI 812 for highlighting at least a part of the stream including the plurality of thumbnails corresponding to the segmentation contents. The masking UI 812 may highlight the at least a part of the stream including the plurality of thumbnails in the unit of a maximum attachment size. Segmentation content corresponding to a thumbnail highlighted by the masking UI 812 may be transmitted later to the external device.

Referring to (a) of FIG. 8, the masking UI 812 may be highlighted on the stream of the plurality of thumbnails, and the unit of a maximum attachment size (e.g., 1 MB) may be displayed around the masking UI 812. In (a) of FIG. 8, thumbnails 821 and 822 selected by the masking UI 812 may be highlighted. In this case, the user may desire to add segmentation contents to be transmitted. To this end, the user may enter a user input 801 for selecting a masking add icon 820 included in the edition UI 811. In this case, within a range that does not exceed a size of content, the user may continuously add the masking UI in the unit of a maximum attachment size.

Upon reception of an input signal from the user, as shown in (b) of FIG. 8, the processor 12 may control the display 11 to display an added masking UI 813 as well as the existing masking UI 812. In this case, delete icons 814 and 815 for deleting the masking UI may be displayed together around or in the masking UIs 812 and 813. Upon selection of a delete icon by the user, the masking UI corresponding to the selected delete icon may be deleted.

The user may desire to change a thumbnail highlighted by the masking UI 813. The user may enter a user input 802 for moving the masking UI 813. The masking UI 813 may be moved in the unit of a thumbnail or may be moved to select (or mask) a part of the thumbnail. When the masking UI 813 selects a part of a thumbnail, segmentation content corresponding to the part of the thumbnail may be a segment of the segmentation content, which corresponds to a rate of the part selected from the thumbnail.

Upon reception of an input signal corresponding to the user input 802 from the user, as shown in (c) of FIG. 8, the processor 12 may control the display 11 to move and display the added masking UI 813. The user determining the thumbnails 821 through 824 corresponding to segmentation contents to be transmitted may enter a user input 803 for completing selection of the selected thumbnails.

Upon reception of an input signal from the user, as shown in (d) of FIG. 8, the processor 12 may control the display 11 to indicate that segmentation contents corresponding to the selected thumbnails are added as attachment content 831, and to display a text message input UI 832 for inputting a text message to be transmitted together with the attachment content 831.

Figure 9:
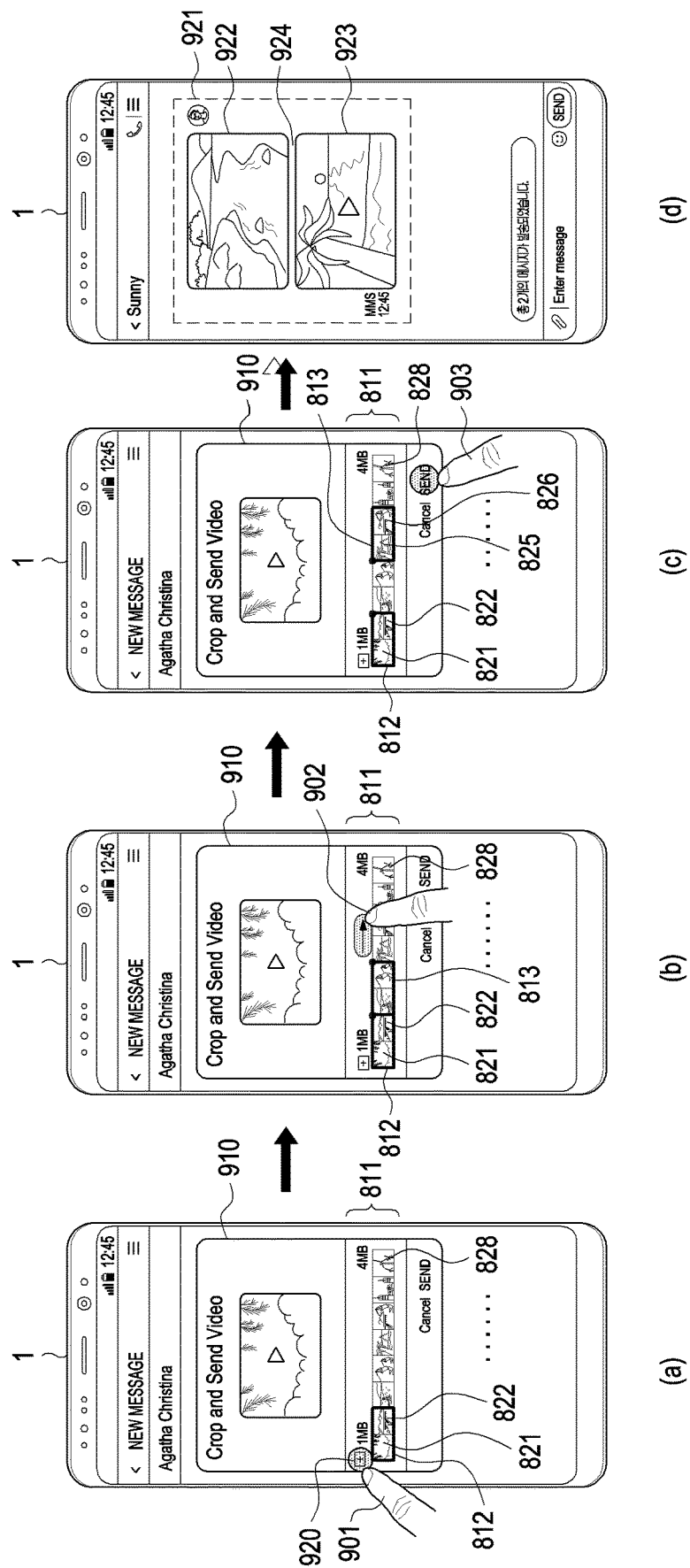

FIG. 9 illustrates a circumstance in which content to be transmitted is edited according to various embodiments of the present disclosure.

In (a) of FIG. 9, the processor 12 may control the display 11 to display an edition UI 811 for editing a message to be transmitted on a popup window 910. For example, upon entry of one of the user inputs 302, 303, and 304 of FIG. 3A, the user inputs 402 and 403 of FIG. 4A, or the user inputs 502 and 503 of FIG. 5A from the user, the processor 12 may control the display 11 to display the edition UI 811 for editing a message on the popup window 910.

The edition UI 811 in (a) of FIG. 9 may correspond to the edition UI 811 in (a) of FIG. 8. That is, through the edition UI 811, the user may select at least one of a plurality of thumbnails in the unit of a maximum attachment size, based on sizes respectively corresponding to the plurality of thumbnails representing the content. In (a) of FIG. 9, the processor 12 may control the display 11 to display the masking UI 812 for selecting thumbnails corresponding to transmitted segmentation contents.

When the user enters a user input 901 for selecting the masking add icon 820 to add a segmentation content to be transmitted in (a) of FIG. 9, the processor 12 may control the display 11 to display the added masking UI 813 as well as the existing masking UI 812 as shown in (b) of FIG. 9.

When the user enters a user input 902 for moving the added masking add UI 813 to determine a segmentation content to be transmitted in (b) of FIG. 9, the processor 12 may control the display 11 to move and display the added masking UI 813 as shown in (c) of FIG. 9.

When the user enters a user input 903 for selecting, as contents to be transmitted, segmentation contents corresponding to thumbnails 821, 822, 825, and 826 highlighted by the masking UIs 812 and 813 in (c) of FIG. 9, the processor 12 may control the display 11 to display transmission information 921 corresponding to transmission of the segmentation contents to be transmitted on the message window as shown in (d) of FIG. 9. In this case, the transmission information 921 may include thumbnails 922 and 923 representing the segmentation contents and an indicator (e.g., a gap) 924 indicating segmentation information of the content. The thumbnails 922 and 923 representing the segmentation contents may be selected from among the thumbnails 821, 822, 825, and 826 selected by the user in (c) of FIG. 9 or may be selected from among still images included in the segmentation contents.

Figure 10:
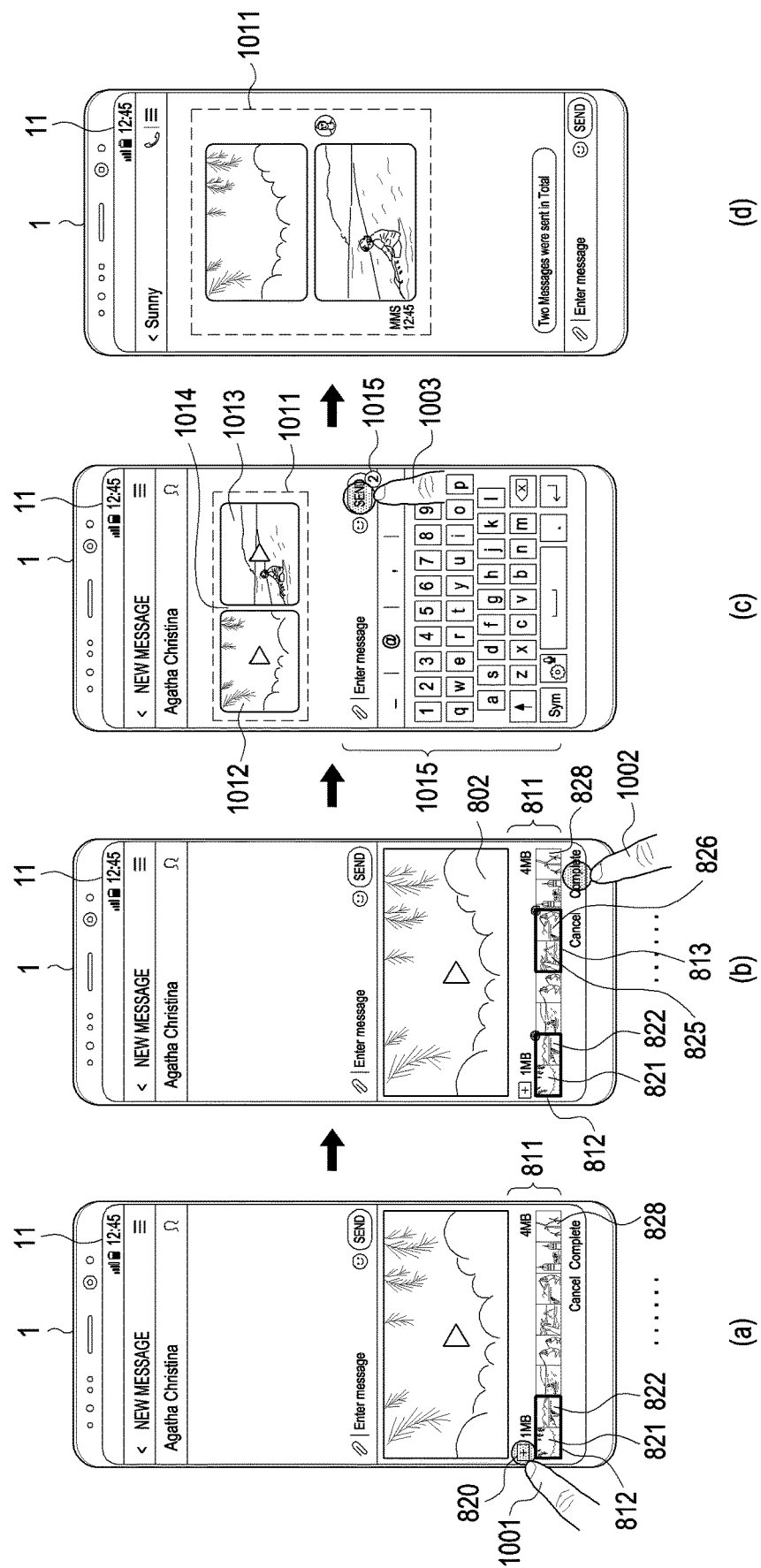

FIG. 10 illustrates a circumstance in which content to be transmitted is edited according to various embodiments of the present disclosure.

In (a) of FIG. 10, the processor 12 may control the display 11 to display an edition UI 811 for editing a message to be transmitted on a new screen. For example, upon entry of one of the user inputs 302, 303, and 304 of FIG. 3A, the user inputs 402 and 403 of FIG. 4A, or the user inputs 502 and 503 of FIG. 5A from the user, the processor 12 may control the display 11 to display a new screen including the edition UI 811 for editing a message.

The edition UI 811 in (a) of FIG. 10 may correspond to the edition UI 811 in (a) of FIG. 8. In (a) and (b) of FIG. 10, the processor 12 may control the display 11 to display the masking UI 812 and 813 for selecting thumbnails corresponding to transmitted segmentation contents.

When the user enters a user input 1002 for selecting, as contents to be transmitted, segmentation contents corresponding to thumbnails 821, 822, 825, and 826 highlighted by the masking UIs 812 and 813 in (b) of FIG. 10, the processor 12 may control the display 11 to display a message transmission standby screen as shown in (c) of FIG. 10. The processor 12 may control the display 11 to indicate on the message transmission standby screen that the selected segmentation contents are added as attachment content 1011, and to display a text message input UI 1015 for inputting a text message to be transmitted together with the attachment content 1011. The attachment content 1011 may include thumbnails 1012 and 1013 representing the segmentation contents and indicators 1014 and 1015 indicating segmentation information of the content. The thumbnails 1012 and 1013 representing the segmentation contents displayed on the message transmission standby screen may be selected from among the thumbnails 821, 822, 825, and 826 selected by the user in (b) of FIG. 10 or may be selected from among still images included in the segmentation contents.

Upon entry of a user input 1003 for requesting transmission of a message in (c) of FIG. 10, the processor 12 may control the display 11 to display a message window including transmission information 1011 corresponding to the transmitted message as shown in (d) of FIG. 10.

Figure 11:
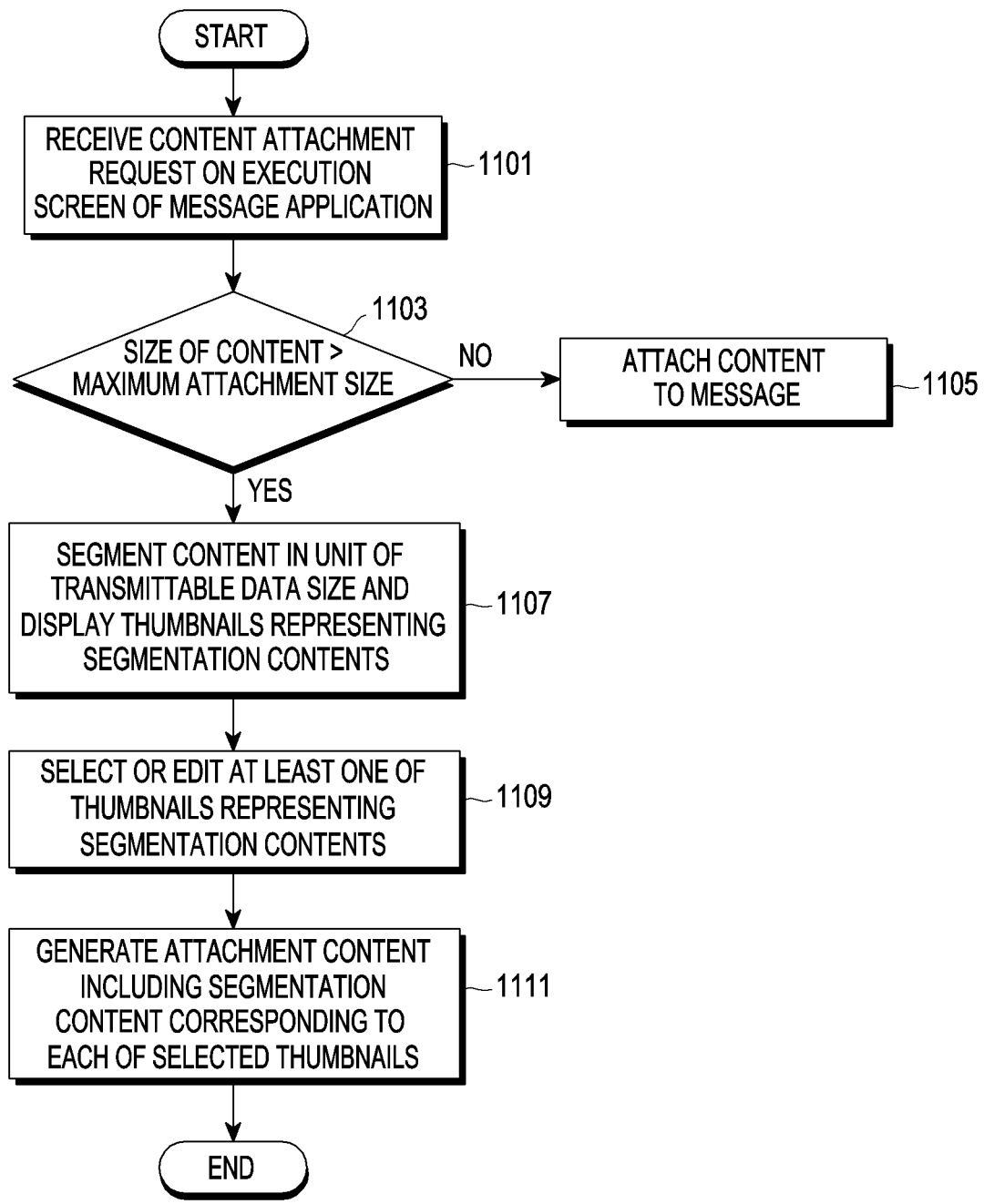
FIGS. 11 and 12 are flowcharts illustrating an electronic device to transmit content according to various embodiments of the present disclosure.

FIG. 11 is a flowchart of the electronic device 1 that transmits content according to various embodiments of the present disclosure.

First, the electronic device 1 may receive a user input for requesting attachment of content (e.g., a moving image) through an execution screen of a message application in operation 1101.

The electronic device 1 may determine whether the size of the requested content exceeds a maximum attachment size in operation 1103.

When the size of the requested content does not exceed the maximum attachment size (No) in operation 1103, the electronic device 1 may attach the content to the message in operation 1105. That is, the electronic device 1 may register the content as attachment content (or an attachment file) of a text message.

On the other hand, when the size of the content exceeds the maximum attachment size (Yes) in operation 1103, the electronic device 1 may segment the content into units of a transmittable data size (e.g., the maximum attachment size) and display thumbnails representing segmentation contents in operation 1107.

The electronic device 1 may receive a user input for selecting or editing at least one of the thumbnails representing the segmentation contents to determine segmentation content to be transmitted, in operation 1109.

The electronic device 1 may generate attachment content including segmentation content(s) corresponding to selected thumbnails, in operation 1111. The electronic device 1 may then transmit the generated attachment content to an external device (e.g., the electronic device 2).

Figure 12:
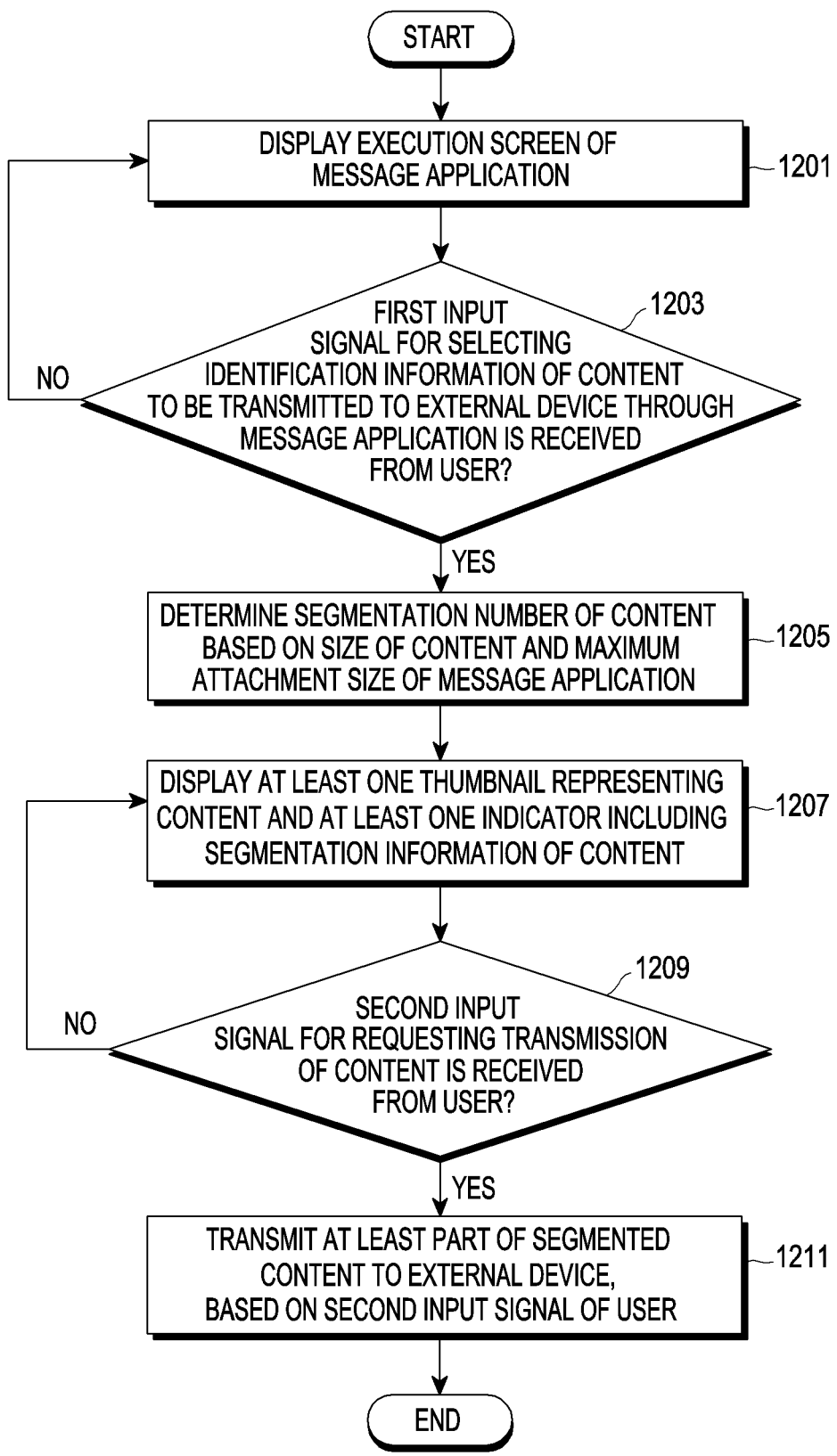

FIG. 12 is a flowchart of the electronic device 1 that transmits content according to various embodiments of the present disclosure.

First, the electronic device 1 may display an execution screen of a message application in operation 1201.

The electronic device 1 may determine whether a first input signal for selecting identification information of content to be transmitted to the external electronic device is received from the user through the message application, in operation 1203.

Upon reception of the first input signal from the user (Yes) in operation 1203, the electronic device 1 may determine a segmentation number of the content, based on the size of the content and a maximum attachment size of the message application, in operation 1205.

The electronic device 1 may display at least one thumbnail representing the content and at least one indicator including segmentation information of the content, in operation 1207. The segmentation information may include at least one of, for example, whether the content is segmented, the segmentation number of the content, or a segmentation size of the content. The at least one indicator may also include at least one graphics (e.g., bar-shape graphics) segmenting a thumbnail representing the content or at least one graphics (e.g., chain-shape graphics) connecting a plurality of thumbnails representing the content, may include graphics (e.g., gap-shape graphics) for distinguishing a plurality of thumbnails representing the content from one another, or may include graphics indicating stacking of a plurality of thumbnails. The at least one indicator may be displayed semi-transparently or opaquely to overlap with at least one thumbnail or may be displayed semi-transparently or opaquely around at least one thumbnail.

In this case, the electronic device 1 may determine whether a second input signal for requesting transmission of the content is received from the user, in operation 1209.

Upon reception of a second input signal from the user (Yes) in operation 1209, the electronic device 1 may transmit at least a part of the segmented content to an external device (e.g., the electronic device 2) based on the user's second input signal, in operation 1211.

According to various embodiments, the electronic device 1 may sequentially display the plurality of thumbnails representing the content in a time sequence. Upon reception of a third input signal for selecting at least one thumbnail from among the plurality of thumbnails from the user, the electronic device 1 may transmit at least a part of the segmented content corresponding to the selected thumbnail to the external device.

According to various embodiments, the electronic device 1 may display a UI for selecting at least one thumbnail from among a plurality of thumbnails in the unit of a maximum attachment size based on sizes respectively corresponding to the plurality of thumbnails. Upon reception of the third input signal for selecting at least one thumbnail from among the plurality of thumbnails from the user, the electronic device 1 may receive the third input signal for selecting at least one thumbnail from among the plurality of thumbnails from the user by using the displayed UI.

According to various embodiments, when sequentially displaying the plurality of thumbnails representing the content in a time sequence, the electronic device 1 may sequentially display as many thumbnails as the segmentation number in the vertical direction or in the horizontal direction in the time sequence.

According to various embodiments, when the size of the content exceeds the maximum attachment size, the electronic device 1 may further display a UI for confirming segmented transmission of the content from the user.

According to various embodiments, upon reception of the second input signal for requesting transmission of the content from the user, the electronic device 1 may further display transmission information corresponding to transmission of the content on the message window. In this case, the transmission information may include at least one thumbnail representing the content, at least one indicator including segmentation information of the content, a transmission time of the content, or a sender of the content.

Figure 13:
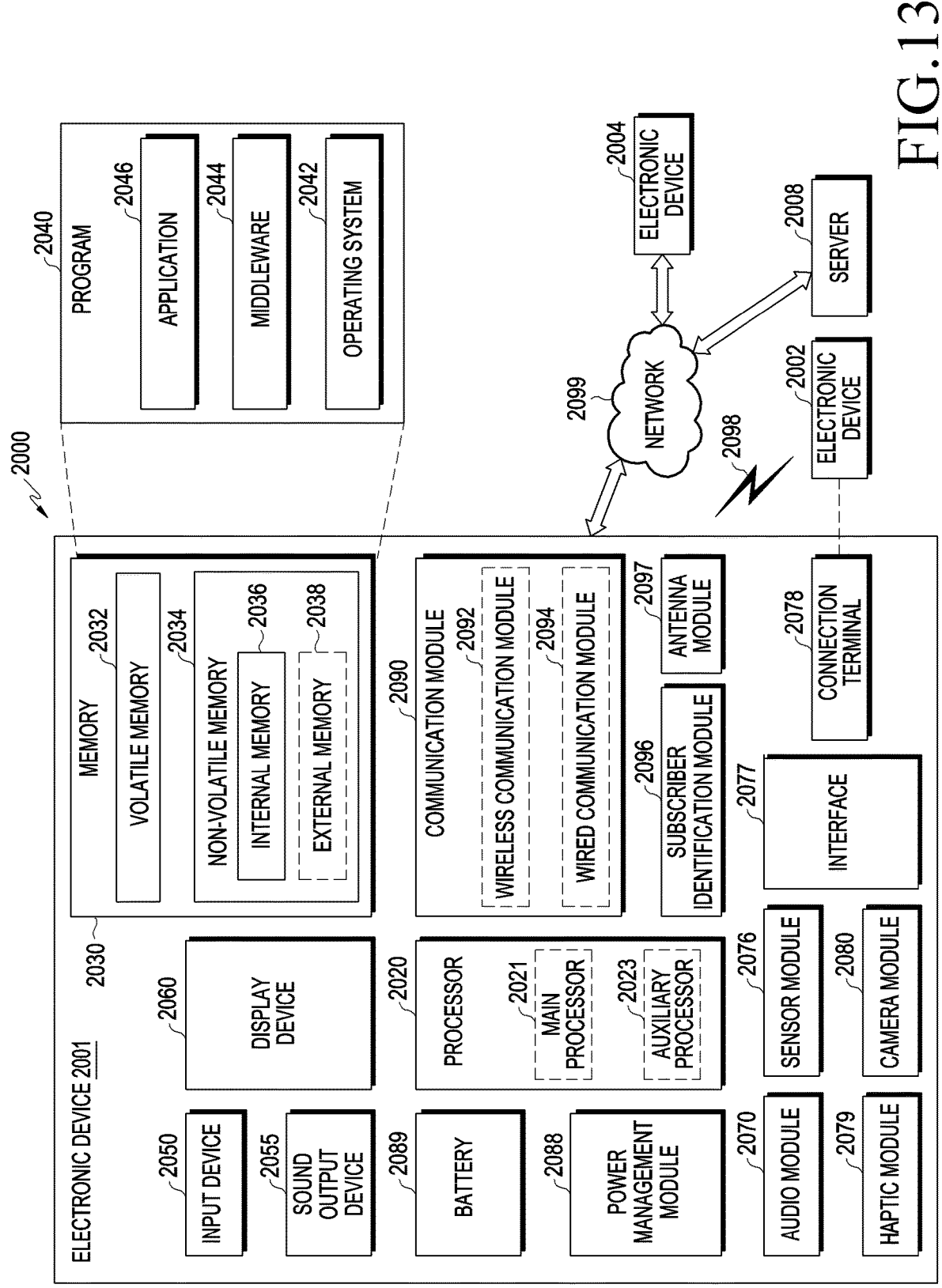
FIG. 13 is a block diagram of an electronic device in a network environment, according to various embodiments.

FIG. 13 is a block diagram illustrating an electronic device 2001 in a network environment 2000 according to various embodiments. The electronic device 2001 may correspond to the first electronic device 1 or the second electronic device 2 illustrated in FIG. 1. Referring to FIG. 13, the electronic device 2001 in the network environment 2000 may communicate with an electronic device 2002 via a first network 2098 (e.g., a short-range wireless communication network), or an electronic device 2004 or a server 2008 via a second network 2099 (e.g., a long-range wireless communication network). According to an embodiment, the electronic device 2001 may communicate with the electronic device 2004 via the server 2008. According to an embodiment, the electronic device 2001 may include a processor 2020, memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module (SIM) 2096, or an antenna module 2097. In some embodiments, at least one (e.g., the display device 2060 or the camera module 2080) of the components may be omitted from the electronic device 2001, or one or more other components may be added in the electronic device 2001. In some embodiments, some of the components may be implemented as a single integrated circuitry. For example, the sensor module 2076 (e.g., a fingerprint sensor, an iris sensor, or an illuminance sensor) may be implemented as embedded in the display device 2060 (e.g., a display).

The processor 2020 may execute, for example, software (e.g., a program 2040) to control at least one other component (e.g., a hardware or software component) of the electronic device 2001 coupled with the processor 2020, and may perform various data processing or computation. According to one embodiment, as at least part of the data processing or computation, the processor 2020 may load a command or data received from another component (e.g., the sensor module 2076 or the communication module 2090) in volatile memory 2032, process the command or the data stored in the volatile memory 2032, and store resulting data in non-volatile memory 2034. According to an embodiment of the present disclosure, the processor 2020 may include a main processor 2021 (e.g., a central processing unit (CPU) or an application processor (AP)), and an auxiliary processor 2023 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 2023 may be adapted to consume less power than the main processor 2021, or to be specific to a specified function. The auxiliary processor 2023 may be implemented as separate from, or as part of the main processor 2021.

The auxiliary processor 2023 may control at least some of functions or states related to at least one component (e.g., the display device 2060, the sensor module 2076, or the communication module 2090) among the components of the electronic device 2001, instead of the main processor 2021 while the main processor 2021 is in an inactive (e.g., sleep) state, or together with the main processor 2021 while the main processor 2021 is in an active state (e.g., executing an application). According to an embodiment of the present disclosure, the auxiliary processor 2023 (e.g., an image signal processor or a communication processor) may be implemented as part of another component (e.g., the camera module 2080 or the communication module 2090) functionally related to the auxiliary processor 2023.

The memory 2030 may store various data used by at least one component (e.g., the processor 2020 or the sensor module 2076) of the electronic device 2001. The various data may include, for example, software (e.g., the program 2040) and input data or output data for a command related thereto. The memory 2030 may include the volatile memory 2032 or the non-volatile memory 2034.

The program 2040 may be stored in the memory 2030 as software, and may include, for example, an operating system (OS) 2042, middleware 2044, or an application 2046.

The input device 2050 may receive a command or data to be used by other component (e.g., the processor 2020) of the electronic device 2001, from the outside (e.g., a user) of the electronic device 2001. The input device 2050 may include, for example, a microphone, a mouse, or a keyboard.

The sound output device 2055 may output sound signals to the outside of the electronic device 2001. The sound output device 2055 may include, for example, a speaker or a receiver. The speaker may be used for general purposes, such as playing multimedia or playing record, and the receiver may be used for an incoming calls. According to an embodiment of the present disclosure, the receiver may be implemented as separate from, or as part of the speaker.

The display device 2060 may visually provide information to the outside (e.g., a user) of the electronic device 2001. The display device 2060 may include, for example, a display, a hologram device, or a projector and control circuitry to control a corresponding one of the display, hologram device, and projector. According to an embodiment, the display device 2060 may include touch circuitry adapted to detect a touch, or sensor circuitry (e.g., a pressure sensor) adapted to measure the intensity of force incurred by the touch.

The audio module 2070 may convert a sound into an electrical signal and vice versa. According to an embodiment of the present disclosure, the audio module 2070 may obtain the sound via the input device 2050, or output the sound via the sound output device 2055 or a headphone of an external electronic device (e.g., an electronic device 2002) directly or wirelessly coupled with the electronic device 2001.

The sensor module 2076 may detect an operational state (e.g., power or temperature) of the electronic device 2001 or an environmental state (e.g., a state of a user) external to the electronic device 2001, and then generate an electrical signal or data value corresponding to the detected state. According to an embodiment of the present disclosure, the sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support one or more specified protocols to be used for the electronic device 2001 to be coupled with the external electronic device (e.g., the electronic device 2002) directly (e.g., wiredly) or wirelessly. According to an embodiment of the present disclosure, the interface 2077 may include, for example, a high definition multimedia interface (HDMI), a universal serial bus (USB) interface, a secure digital (SD) card interface, or an audio interface.

A connecting terminal 2078 may include a connector via which the electronic device 2001 may be physically connected with the external electronic device (e.g., the electronic device 2002). According to an embodiment of the present disclosure, the connecting terminal 2078 may include, for example, a HDMI connector, a USB connector, a SD card connector, or an audio connector (e.g., a headphone connector).

The haptic module 2079 may convert an electrical signal into a mechanical stimulus (e.g., a vibration or motion) or electrical stimulus which may be recognized by a user via his tactile sensation or kinesthetic sensation. According to an embodiment of the present disclosure, the haptic module 2079 may include, for example, a motor, a piezoelectric element, or an electric stimulator.

The camera module 2080 may capture a still image or moving images. According to an embodiment, the camera module 2080 may include one or more lenses, image sensors, image signal processors, or flashes.

The power management module 2088 may manage power supplied to the electronic device 2001. According to one embodiment of the present disclosure, the power management module 2088 may be implemented as at least part of, for example, a power management integrated circuit (PMIC).

The battery 2089 may supply power to at least one component of the electronic device 2001. According to an embodiment of the present disclosure, the battery 2089 may include, for example, a primary cell which is not rechargeable, a secondary cell which is rechargeable, or a fuel cell.

The communication module 2090 may support establishing a direct (e.g., wired) communication channel or a wireless communication channel between the electronic device 2001 and the external electronic device (e.g., the electronic device 2002, the electronic device 2004, or the server 1308) and performing communication via the established communication channel. The communication module 2090 may include one or more communication processors that are operable independently from the processor 2020 (e.g., the application processor (AP)) and supports a direct (e.g., wired) communication or a wireless communication. According to an embodiment of the present disclosure, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device via the first network 2098 (e.g., a short-range communication network, such as Bluetooth™, Wireless-Fidelity (Wi-Fi) direct, or infrared data association (IrDA)) or the second network 2099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2092 may identify and authenticate the electronic device 2001 in a communication network, such as the first network 2098 or the second network 2099, using subscriber information (e.g., international mobile subscriber identity (IMSI)) stored in the subscriber identification module 2096.

The antenna module 2097 may transmit or receive a signal or power to or from the outside (e.g., the external electronic device). According to an embodiment, the antenna module 2097 may include one or more antennas, and, therefrom, at least one antenna appropriate for a communication scheme used in the communication network, such as the first network 1198 or the second network 1199, may be selected, for example, by the communication module 2090. The signal or the power may then be transmitted or received between the communication module 2090 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 2001 and the external electronic device 2004 via the server 2008 coupled with the second network 2099. Each of the electronic devices 2002 and 2004 may be a device of a same type as, or a different type, from the electronic device 2001. According to an embodiment of the present disclosure, all or some of operations to be executed at the electronic device 2001 may be executed at one or more of the external electronic devices 2002, 2004, or 2008. For example, when the electronic device 2001 should perform a function or a service automatically, or in response to a request from a user or another device, the electronic device 2001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2001. The electronic device 2001 may provide the outcome, with or without further processing of the outcome, as at least part of a reply to the request. To that end, a cloud computing, distributed computing, or client-server computing technology may be used, for example.

Figure 14:
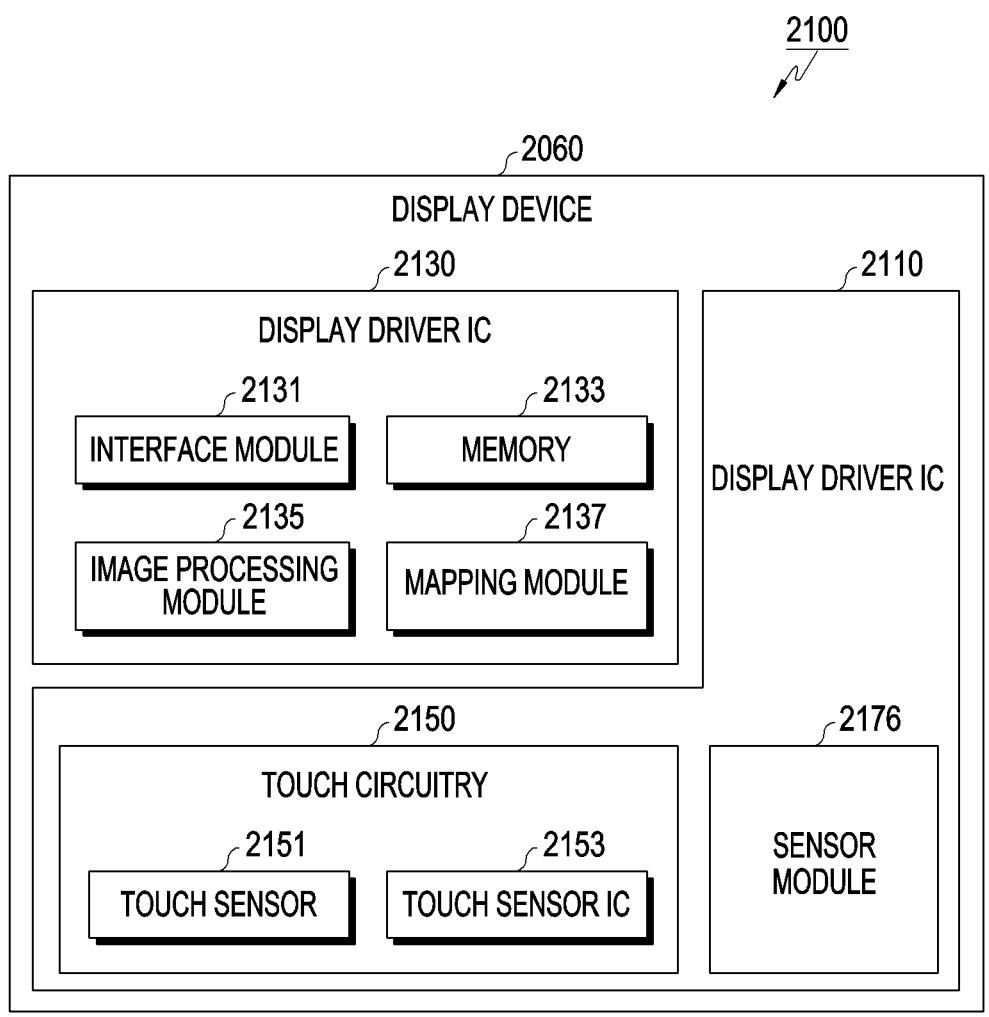
FIG. 14 is a block diagram illustrating a display device according to various embodiments.

FIG. 14 is a block diagram 2100 illustrating the display device 2060 of FIG. 13 according to various embodiments. Referring to FIG. 14, the display device 2060 may include a display 2110 and a display driver integrated circuit (IC) (DDI) 2130 to control the display 2110. The DDI 2130 may include an interface module 2131, memory 2133 (e.g., buffer memory), an image processing module 2135, or a mapping module 2137. The DDI 2130 may receive image information that contains image data or an image control signal corresponding to a command to control the image data from another component of the electronic device 1101 via the interface module 2131. For example, according to an embodiment, the image information may be received from the processor 2020 (e.g., the main processor 2021 (e.g., an application processor)) or the auxiliary processor 2023 (e.g., a graphics processing unit) operated independently from the function of the main processor 2021. The DDI 2130 may communicate, for example, with touch circuitry 2150 or the sensor module 2076 via the interface module 2131. The DDI 2130 may also store at least part of the received image information in the memory 2133, for example, on a frame by frame basis. The image processing module 2135 may perform pre-processing or post-processing (e.g., adjustment of resolution, brightness, or size) with respect to at least part of the image data, for example, based at least in part on one or more characteristics of the image data or one or more characteristics of the display 2110. The mapping module 2137 may generate a voltage value or a current value corresponding to the image data pre-processed or post-processed by the image processing module 2035. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 2110. At least some pixels of the display 2110 may be driven, for example, based at least in part on the voltage value or the current value such that visual information (e.g., a text, an image, or an icon) corresponding to the image data may be displayed via the display 2110.

According to an embodiment, the display device 2060 may further include the touch circuitry 2150. The touch circuitry 2150 may include a touch sensor 2151 and a touch sensor IC 2153 to control the touch sensor 251. The touch sensor IC 2153 may control the touch sensor 2151 to sense a touch input or a hovering input with respect to a certain position on the display 2110. For example, the touch sensor IC 2153 may detect a touch input or a hovering input by measuring a change in a signal (e.g., a voltage, a quantity of light, a resistance, or a quantity of one or more electric charges) corresponding to the certain position on the display 2110. The touch sensor IC 2153 may provide information (e.g., a position, an area, a pressure, or a time) indicative of the touch input or the hovering input detected via the touch sensor 251 to the processor 2020. According to an embodiment, at least part (e.g., the touch sensor IC 2153) of the touch circuitry 2150 may be formed as part of the display 2110 or the DDI 2130, or as part of another component (e.g., the auxiliary processor 2023) disposed outside the display device 2060.

According to an embodiment, the display device 2060 may further include at least one sensor (e.g., a fingerprint sensor, an iris sensor, a pressure sensor, or an illuminance sensor) of the sensor module 2076 or a control circuit for the at least one sensor. In such a case, the at least one sensor or the control circuit for the at least one sensor may be embedded in one portion of the display device 2060 (e.g., the display 2110 or the DDI 2130) or one portion of the touch circuitry 2150). For example, when the sensor module 2076 embedded in the display device 2060 includes a biometric sensor (e.g., a fingerprint sensor), the biometric sensor may obtain biometric information (e.g., a fingerprint image) corresponding to a touch input received via a portion of the display 2110. As another example, when the sensor module 2076 embedded in the display device 2060 includes a pressure sensor, the pressure sensor may obtain pressure information corresponding to a touch input received via a partial or whole area of the display 2110. According to an embodiment, the touch sensor 2151 or the sensor module 2076 may be disposed between pixels in a pixel layer of the display 2110, or over or under the pixel layer.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the present disclosure, the module may be implemented in a form of an application-specific integrated circuit (ASIC).

Various embodiments as set forth herein may be implemented as software (e.g., the program 2040) including one or more instructions that are stored in a storage medium (e.g., internal memory 2036 or external memory 2038) that is readable by a machine (e.g., the electronic device 100 or the electronic device 2001). For example, a processor (e.g., the processor 2020) of the machine (e.g., the electronic device 100 or the electronic device 2001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:
1. A method for transmitting content, the method comprising:
   displaying an execution screen of a message application;
   receiving a first input for selecting content to be transmitted to an external device through the message application;

determining a segmentation number of the content, based on a size of the content and a maximum attachment size of the message application, in response to reception of the first input;

displaying at least one thumbnail representing the content in the execution screen of the message application before transmitting at least a part of the content, wherein at least one indicator indicating that the content is segmented, based on the determined segmentation number, is displayed in the at least one thumbnail;

receiving a second input for requesting transmission of the content; and transmitting at least the part of the content that has been segmented to the external device in response to reception of the second input.

2. The method of claim 1, further comprising:

sequentially displaying a plurality of thumbnails representing the content in a time sequence in the execution screen of the message application; and receiving a third input for selecting at least one of the plurality of thumbnails, wherein the transmitting at least the part of the content that has been segmented to the external device comprises transmitting at least a part of the content that has been segmented corresponding to the selected thumbnail based on the third input.

3. The method of claim 2, further comprising displaying a masking user interface (UI) through which at least one of the plurality of thumbnails is selectable in a unit of the maximum attachment size, based on sizes respectively corresponding to the plurality of thumbnails.

4. The method of claim 2, wherein the sequentially displaying the plurality of thumbnails representing the content in the time sequence comprises sequentially displaying as many thumbnails as the segmentation number in a vertical direction or in a horizontal direction in the time sequence in the execution screen of the message application.

5. The method of claim 1, wherein the at least one indicator comprises at least one of at least one graphics segmenting a thumbnail representing the content, at least one graphics connecting a plurality of thumbnails representing the content, or graphics distinguishing the plurality of thumbnails representing the content from one another.

6. The method of claim 1, wherein the at least one indicator is displayed semi-transparently or opaquely to overlap with the at least one thumbnail.

7. The method of claim 1, further comprising displaying a UI(user interface) for confirming segmented transmission of the content from a user, when the size of the content exceeds the maximum attachment size.

8. The method of claim 1, further comprising displaying transmission information corresponding to transmission of the content on a message window, wherein the transmission information comprises the at least one thumbnail representing the content, the at least one indicator, a transmission time of the content, or a sender of the content.

9. An electronic device comprising:

a display;

a communication circuit;

at least one processor; and at least one memory electrically connected with the display, the communication circuit, and the at least one processor, wherein the at least one memory stores instructions configured to, when executed, cause the at least one processor to:

control the display to display an execution screen of a message application;

determine a segmentation number of content to be transmitted to an external device through the message application, based on a size of the content and a maximum attachment size of the message application, in response to reception of a first input for selecting identification information of the content;

control the display to display at least one thumbnail representing the content in the execution screen of the message application before transmitting at least a part of the content, wherein at least one indicator indicating that the content is segmented, based on the determined segmentation number, is displayed in the at least one thumbnail; and control the communication circuit to transmit at least the part of the content that has been segmented to the external device, in response to reception of a second input for requesting transmission of the content.

10. The electronic device of claim 9, wherein the instructions are configured to cause the at least one processor to:

control the display to sequentially display a plurality of thumbnails representing the content in a time sequence in the execution screen of the message application; and control the communication circuit to transmit, in response to reception of a third input for selecting at least one thumbnail from among the plurality of thumbnails, at least a part of the content that has been segmented corresponding to the selected thumbnail to the external device.

11. The electronic device of claim 10, wherein the instructions are configured to cause the at least one processor to:

control the display to display a masking user interface (UI) through which at least one of the plurality of thumbnails is selectable in the unit of the maximum attachment size, based on sizes respectively corresponding to the plurality of thumbnails; and control the communication circuit to transmit, in response to reception of a third input for selecting at least one thumbnail from among the plurality of thumbnails by using the masking UI, at least a part of the content that has been segmented corresponding to the selected thumbnail to the external device.

12. The electronic device of claim 10, wherein the instructions are configured to cause the at least one processor to control the display to sequentially display as many thumbnails as the segmentation number in a vertical direction or in a horizontal direction in the time sequence in the execution screen of the message application.

13. The electronic device of claim 9, wherein the at least one indicator comprises at least one of at least one graphics segmenting a thumbnail representing the content, at least one graphics connecting a plurality of thumbnails representing the content, or graphics distinguishing the plurality of thumbnails representing the content from one another.

14. The electronic device of claim 9, wherein the at least one indicator is displayed semi-transparently or opaquely to overlap with the at least one thumbnail.

15. The electronic device of claim 9, wherein the instructions are configured to cause the at least one processor to control the display to display a UI (user interface) for confirming segmented transmission of the content from a user when the size of the content exceeds the maximum attachment size.

* * * * *